US011368273B2

(12) United States Patent
Oh et al.

(10) Patent No.: US 11,368,273 B2
(45) Date of Patent: Jun. 21, 2022

(54) METHOD AND APPARATUS FOR CHANNEL ACCESS IN UNLICENSED BAND IN WIRELESS COMMUNICATION SYSTEM

(71) Applicant: Samsung Electronics Co., Ltd., Suwon-si (KR)

(72) Inventors: Jinyoung Oh, Seoul (KR); Sungjin Park, Incheon (KR); Jeongho Yeo, Hwaseong-si (KR); Heedon Gha, Suwon-si (KR); Taehan Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 16/637,558

(22) PCT Filed: Aug. 7, 2018

(86) PCT No.: PCT/KR2018/008995
§ 371 (c)(1),
(2) Date: Feb. 7, 2020

(87) PCT Pub. No.: WO2019/031830
PCT Pub. Date: Feb. 14, 2019

(65) Prior Publication Data
US 2020/0259621 A1 Aug. 13, 2020

(30) Foreign Application Priority Data

Aug. 10, 2017 (KR) .................. 10-2017-0101670
Nov. 14, 2017 (KR) .................. 10-2017-0151675

(51) Int. Cl.
H04L 5/00 (2006.01)
H04W 72/04 (2009.01)

(52) U.S. Cl.
CPC ......... H04L 5/0055 (2013.01); H04W 72/042 (2013.01)

(58) Field of Classification Search
CPC ........................... H04L 5/0055; H04W 72/042
See application file for complete search history.

(56) References Cited

U.S. PATENT DOCUMENTS 10,708,000 B2 * 7/2020 He .................. H04L 1/1812
2010/0135422 A1 6/2010 Lee et al.
(Continued)

FOREIGN PATENT DOCUMENTS

JP 2010-093449 A 4/2010
KR 10-2009-0030206 A 3/2009
(Continued)

OTHER PUBLICATIONS

Extended European Search Report dated Mar. 16, 2021, issued in a counterpart European Application No. 18843395.7-1215.
(Continued)

Primary Examiner — Michael J Moore, Jr.
(74) Attorney, Agent, or Firm — Jefferson IP Law, LLP

(57) ABSTRACT

Disclosed are: a communication technique for merging, with IoT technology, a 5G communication system for supporting a data transmission rate higher than that of a 4G system; and a system therefor. The present disclosure can be applied to intelligent services (for example, smart home, smart building, smart city, smart car or connected car, healthcare, digital education, retail, security, and safety-related services, and the like) on the basis of 5G communication technology and an IoT-related technology. The present invention relates to a method and an apparatus for channel access in a wireless communication system operating in an unlicensed band. More particularly, disclosed are a method by which a node for transmitting a signal through an unlicensed band deter-
(Continued)

mines a channel occupation state of the unlicensed band, and a method for transmitting the signal to the unlicensed band according to the determined channel occupation state of the unlicensed band.

14 Claims, 15 Drawing Sheets

(56) References Cited

U.S. PATENT DOCUMENTS

| | | | |
|---|---|---|---|
| 2010/0246604 | A1 | 9/2010 | Kim et al. |
| 2017/0019909 | A1* | 1/2017 | Si .................... H04W 76/28 |
| 2017/0055296 | A1* | 2/2017 | Cheng ............... H04W 74/0808 |
| 2017/0150524 | A1 | 5/2017 | Oh et al. |
| 2017/0188387 | A1* | 6/2017 | Mukherjee ........ H04W 74/0808 |
| 2018/0175975 | A1* | 6/2018 | Um .................... H04W 72/14 |
| 2018/0242360 | A1 | 8/2018 | Noh et al. |
| 2018/0254858 | A1* | 9/2018 | He ..................... H04L 1/1867 |
| 2019/0253224 | A1* | 8/2019 | Sun ................... H04W 74/08 |
| 2020/0236709 | A1* | 7/2020 | Park .................. H04L 5/00 |
| 2020/0275482 | A1* | 8/2020 | Oh .................... H04W 74/08 |

FOREIGN PATENT DOCUMENTS

| | | |
|---|---|---|
| KR | 10-1518346 B1 | 5/2015 |
| KR | 10-2017-0020238 A | 2/2017 |
| KR | 10-2017-0060775 A | 6/2017 |
| WO | 2017/069798 A1 | 4/2017 |
| WO | 2017/074160 A1 | 5/2017 |

OTHER PUBLICATIONS

ZTE: "Contention Window Adaptation based on HARQ-ACK feedback", 3GPP Draft; R1-156984 Contention Window Adaptation Based on HARQ-ACK Feedback, 3rd Generation Partnership Project (3GPP), vol. RAN WG1, No. XP051 042116; Nov. 7, 2015, Anaheim, USA. Retrieved from the Internet: URL:http://www.3gpp.org/ftp/tsg_ran/WG1_RL1/TSGR1_83/Docs/.

Huawei et al: "Triggering mechanism for contention window size adaptation", 3GPP Draft; R1-153782, 3rd Generation Partnership Project (3GPP), vol. RAN WG1, No. XP051001228; Aug. 23, 2015, Beijing, China. Retrieved from the Internet: URL:http://www.3gpp.org/ftp/Meetings_3GPP_SYNC/RAN1IDocsl.

LG Electronics: "Discussion on CB group based HARQ operation", 3GPP Draft; R1-1704916 NR CBG HARQ_FINAL, 3rd Generation Partnership Project (3GPP), vol. RAN WG1, No. XP051243051; Apr. 2, 2017, Spokane, USA. Retrieved from the Internet: URL:http://www.3gpp.org/ftp/Meetings_3GPP_SYNC/RAN1IDocsl.

Ericsson: "On CWS adjustment based on HARQ-ACK feedback", 3GPP Draft; R1-156034, 3rd Generation Partnership Project (3GPP), vol. RAN WG1, No. XP051 041852; Sep. 26, 2015, Malmo, Sweden. Retrieved from the Internet: U RL:http://www.3gpp.org/ftp/tsg_ran/WG1_RL1/TSGR1_82b/Docsl.

Huawei et al: "Performance comparison of LBT categories", 3GPP Draft; R1-150977, 3rd Generation Partnership Project (3GPP), vol. RAN WG1, No. XP050951484; Mar. 21, 2015, Paris, France. Retrieved from the Internet: URL:http://www.3gpp.org/ftp/tsg_ran/WG1_RL1/TSGR1_AH/LTE_LAA_1503/Docs/.

* cited by examiner

METHOD AND APPARATUS FOR CHANNEL ACCESS IN UNLICENSED BAND IN WIRELESS COMMUNICATION SYSTEM

TECHNICAL FIELD

The disclosure relates to a channel access method and apparatus in a wireless communication system that operates in an unlicensed band. More particularly, the disclosure relates to a method of determining a channel occupancy state in an unlicensed band by a node that desires to transmit a signal in the unlicensed band, and a method of transmitting a signal in the unlicensed band according to the determined channel occupancy state in the unlicensed band.

BACKGROUND ART

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beamforming, and large scale antenna are being discussed as means to mitigate a propagation path loss in the mm Wave band and increase a propagation transmission distance.

Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system is developing hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies.

Meanwhile, the Internet has evolved into an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields, such as a smart home, smart building, smart city, smart car, connected car, smart grid, health care, smart home appliance, or high-tech medical service, through the convergence of the conventional Information Technology (IT) and various industries.

Accordingly, various attempts to apply the 5G communication to the IoT network are made. For example, the 5G communication technology, such as a sensor network, machine-to-machine (M2M) communication, and machine-type communication (MTC), has been implemented by a technique, such as beamforming, MIMO, and array antennas. The application of a cloud RAN as the big data processing technology may be an example of convergence of the 5G technology and the IoT technology.

In the case of the 5G communication system, in order to provide various services and a high data rate, various technologies, such as retransmission in units of code block groups, transmission of an uplink signal without uplink scheduling information, and the like, will be introduced. Therefore, a more effective channel access procedure that takes into consideration various variables may be needed in order to perform the 5G communication via an unlicensed band.

DISCLOSURE OF INVENTION

Technical Problem

Therefore, the disclosure has been made in view of the above-mentioned problems, and an aspect of the disclosure is to provide a channel access procedure by a base station or a terminal which desire to transmit a downlink or uplink signal via an unlicensed band. Particularly, a method of managing or changing a contention window by a base station or a terminal in order to perform a channel access procedure may be provided.

Solution to Problem

In accordance with an aspect of the disclosure, a method of transmitting a signal, by a base station in a wireless communication system that uses an unlicensed band, may include: transmitting, to a terminal, configuration information, which configures data transmission performed in units of code block groups (CBG); performing a channel access procedure, and transmitting downlink control information for scheduling downlink data and the downlink data to the terminal; receiving reception acknowledgement information associated with the downlink data from the terminal; and determining the size of a contention window for channel access by comparing the rate of negative acknowledgements (NACK) determined based on the reception acknowledgement information and a predetermined threshold value, wherein the reception acknowledgement information associated with the downlink data is reception acknowledgement information associated with downlink data in units of CBGs.

In accordance with an aspect of the disclosure, a method of receiving a signal, by a terminal of a wireless communication system that uses an unlicensed band, may include: receiving, from a base station, configuration information that configures data transmission performed in units of code block groups (CBG); receiving downlink control information that schedules downlink data and the downlink data from the base station; generating reception acknowledgement information associated with the downlink data; and transmitting reception acknowledgement information associated with the downlink data to the base station, wherein the reception acknowledgement information associated with the downlink data is reception acknowledgement information associated with downlink data in units of CBGs.

In accordance with an aspect of the disclosure, a base station that transmits a signal in a wireless communication system that uses an unlicensed band, may include: a transceiver unit; and a controller connected to the transceiver unit, and configured to perform control so as to: transmit, to a terminal, configuration information that configures data transmission performed in units of code block groups (CBG); perform a channel access procedure and transmit downlink control information for scheduling downlink data and the downlink data to the terminal; receive reception acknowledgement information associated with the downlink data from the terminal; and determine the size of a contention window for channel access by comparing the rate of negative acknowledgements (NACK) determined based on the reception acknowledgement information with a predetermined threshold value, wherein the reception acknowledgement information associated with the downlink data is reception acknowledgement information associated with downlink data in units of CBGs.

In accordance with an aspect of the disclosure, a terminal that receives a signal in a wireless communication system that uses an unlicensed band, may include: a transceiver unit; and a controller connected to the transceiver unit, and configured to: receive, from a base station, configuration information that configures data transmission performed in units of code block groups (CBG); receive the downlink control information for scheduling downlink data and the downlink data from the base station; generate reception acknowledgement information associated with the downlink data; and transmit reception acknowledgement information associated with the downlink data to the base station, wherein the reception acknowledgement information associated with the downlink data is reception acknowledgement information associated with downlink data in units of CBGs.

Advantageous Effects of Invention

According to an embodiment, a transmission device (a base station or a terminal) that desires to transmit a signal via an unlicensed band may perform a channel access procedure using a signal reception result which is transmitted or reported, to the transmission device, from a reception device that receives the signal transmitted from the transmission device. Particularly, the size of a contention window which is used for the channel access procedure may be managed or changed using the signal reception result, and the channel access procedure may be performed based on the size of the contention window. Radio resources may be efficiently used via the method and apparatus.

MODE FOR THE INVENTION

Figure 1:
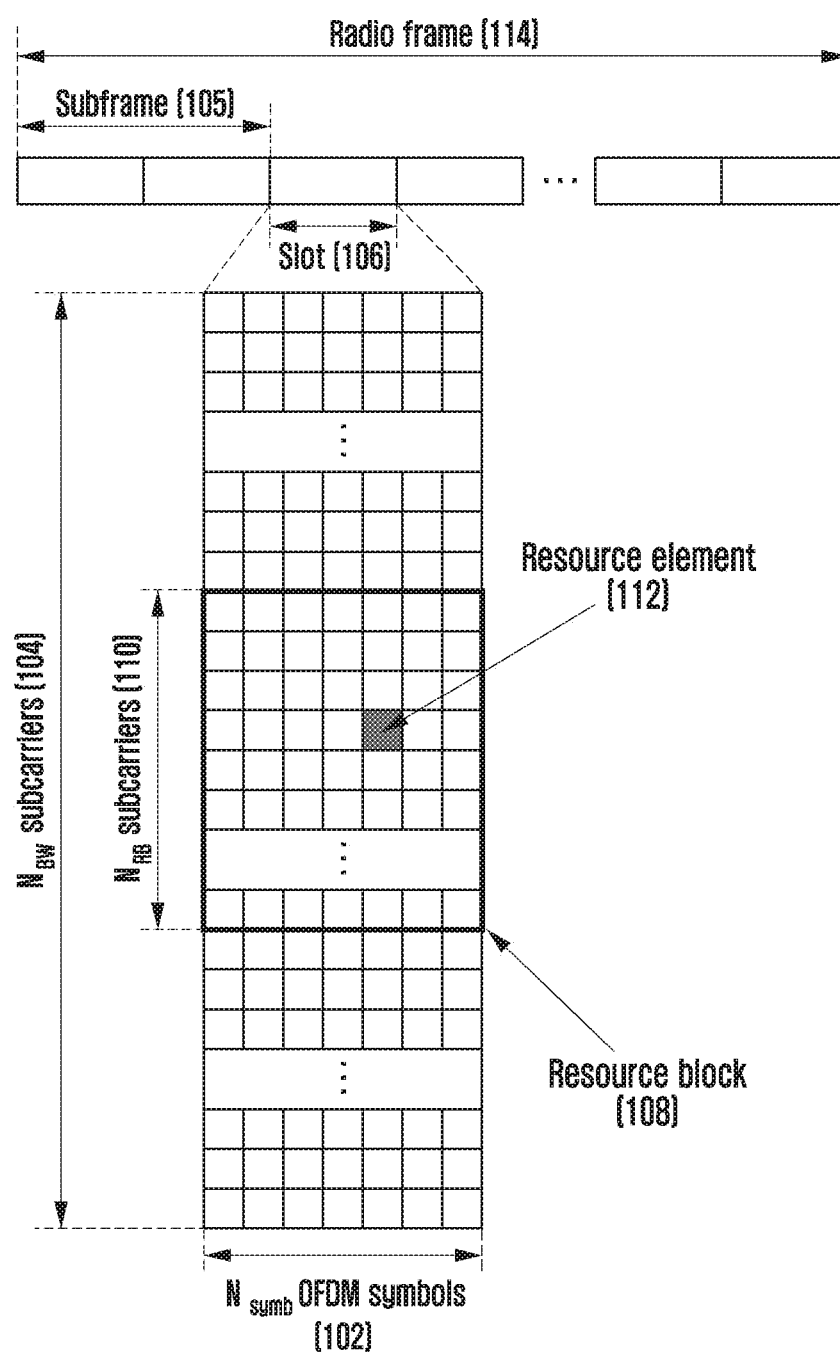
FIG. 1 is a diagram illustrating the structure of a time-frequency domain for downlink transmission in an LTE or LTE-A system.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and methods of achieving the same will be apparent by referring to embodiments of the disclosure as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and methods of achieving the same will be apparent by referring to embodiments of the disclosure as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, " . . . unit" may include one or more processors.

A wireless communication system has developed to be a broadband wireless communication system that provides a high-speed and high-quality packet data service, like the communication standards, for example, high speed packet access (HSPA) of 3GPP, long term evolution (LTE) or evolved universal terrestrial radio access (E-UTRA), LTE-advanced (LTE-A), high rate packet data (HRPD) of 3GPP2, ultra mobile broadband (UMB), and 802.16e of IEEE, or the like, beyond the voice-based service provided at the initial stage. Also, as a 5G wireless communication system, the communication standard of 5G or new radio (NR) is being developed.

In the wireless communication system including the 5G, at least one service from among enhanced mobile broadband (eMBB), massive machine type communications (mMTC), and ultra-reliable and low-latency communications (URLLC) may be provided to a terminal. In this instance, the services may be provided to the same terminal during the same time interval. In an embodiment, eMBB may be a service for high-speed transmission of high-capacity data. mMTC may be a service for minimizing the power consumed by a terminal, and for supporting multiple terminal access. URLLC may be a service for high reliability and low latency. However, the disclosure is not limited thereto. The three services are the main scenarios in the LTE system or a post-LTE system, such as 5G, NR or the like.

Hereinafter, a base station is a subject of performing resource allocation with respect to a terminal, and may be at least one of an eNodeB, a NodeB, a base station (BS), a wireless access unit, a base station controller, or a node on a network. A terminal may include a user equipment (UE), a mobile station (MS), a cellular phone, a smart phone, a computer, or a multimedia system capable of performing a communication function. In the disclosure, a downlink (DL) is a wireless transmission path of a signal that a base station transmits to a terminal. An uplink is a wireless transmission path of a signal that a terminal transmits to a base station. Also, the embodiments of the disclosure will be described with reference to an LTE or an LTE-A system. Also, terms, "physical channel" and "signal," used in the legacy LTE or LTE-A system may be used in order to describe the method and apparatus of the disclosure. However, the embodiments of the disclosure may be applicable to other communication systems which have a similar technical background or a similar channel type. For example, the 5G mobile communication technology (hereinafter, 5G and NR are interchangeably used) developed after LTE-A may be included.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). In the multiple access schemes as described above, time-frequency resources used to deliver data or control information are allocated and operated in a manner to prevent overlapping of the time-frequency resources in which data or control information is to be transmitted, that is, to establish the orthogonality, between users, so as to identify data or control information of each user.

When decoding fails at the initial transmission, the LTE system employs hybrid automatic repeat reQuest (HARQ) that retransmits the corresponding data in a physical layer. HARQ refers to a scheme that enables a receiver to transmit, to a transmitter, information (negative acknowledgement (NACK)) indicating the failure of decoding when the receiver does not correctly decode data, so that the transmitter retransmits the corresponding data in a physical layer.

The receiver may combine data retransmitted from the transmitter and the previous data, decoding of which had failed, whereby data reception performance may increase. Also, when the receiver correctly decodes data, the receiver transmits, to the transmitter, information (ACK) reporting that decoding is successfully executed, so that the transmitter transmits new data.

FIG. 1 is a diagram illustrating the basic structure of a time-frequency domain which is a radio resource region in which data or a control channel is transmitted in a downlink of an LTE system or a system similar thereto.

In FIG. 1, the horizontal axis indicates the time domain and the vertical axis indicates the frequency domain. In the time domain, the minimum transmission unit is an OFDM symbol. One slot 106 includes $N_{symb}$ OFDM symbols 102, and one subframe 105 includes two slots. The length of one slot is 0.5 ms, and the length of one subframe is 1.0 ms. A radio frame 114 is a time domain unit including 10 subframes. In the frequency domain, the minimum transmission unit is a subcarrier. The entire system transmission bandwidth may include a total of $N_{BW}$ subcarriers 104. In this instance, a detailed numeral value may be variable.

In the time-frequency domain, a basic resource unit is a resource element (RE) 112, and an RE may be expressed by an OFDM symbol index and a subcarrier index. A resource block (RB) (or physical resource block (PRB) 108) may be defined by $N_{symb}$ consecutive OFDM symbols 102 in the time domain and $N_{RB}$ consecutive subcarriers 110 in the frequency domain. Therefore, in one slot, a single RB 108 may include $N_{symb} \times N_{RB}$ REs 112. Normally, the minimum allocation unit for data in the frequency domain is the RB 108. In the LTE system, generally, $N_{symb}=7$ and $N_{RB}=12$. $N_{BW}$ is proportional to a system transmission bandwidth. The data rate may increase in proportion to the number of RBs scheduled for a terminal.

In the LTE system, six transmission bandwidths are defined and used. In the case of a frequency division multiplexing (FDD) system that operates by distinguishing a downlink and an uplink by frequency, a downlink transmission bandwidth and an uplink transmission bandwidth may be different from each other. A channel bandwidth may indicate an RF bandwidth corresponding to a system transmission bandwidth. For example, in the LTE system having a channel bandwidth of 10 MHz, a transmission bandwidth may include 50 RBs.

Downlink control information may be transmitted within first N OFDM symbols included in a subframe. According to an embodiment, generally, N={1, 2, 3}, and may be variable depending on the amount of control information to be transmitted in the current subframe. The transmitted control information may include a control channel transmission interval indicator indicating how many OFDM symbols are used when the control information is transmitted, scheduling information associated with downlink data or uplink data, and information associated with a HARQ ACK/NACK.

In the LTE system, scheduling information associated with downlink data or uplink data may be transmitted from a base station to a terminal via downlink control information (DCI). DCI is defined according to various formats. Depending on each format, it is identified whether the DCI is for scheduling information (UL grant) for uplink data or for scheduling information (DL grant) for downlink data, whether the size of control information is small compact DCI, whether spatial multiplexing using multiple antennas is applied, whether DCI is for the purpose of power control, or the like. For example, DCI format 1 which is the scheduling control information (DL grant) for downlink data may include at least one of the following pieces of control information.

Resource allocation type 0/1 flag: indicates whether a resource allocation scheme is type 0 or type 1. Type 0 allocates resources in units of resource block groups (RBGs) by applying a bitmap scheme. In the LTE system, a basic scheduling unit is a resource block (RB) expressed as time and frequency domain resources, and an RBG includes a plurality of RBs and is used as a basic scheduling unit in the type 0 scheme. Type 1 allocates a predetermined RB in an RBG.

Resource block assignment: indicates an RB allocated for data transmission. An expressed resource is determined according to a system bandwidth and a resource allocation scheme.

Modulation and coding scheme (MCS): indicates a modulation scheme used for data transmission and the size of a transport block (TB), which is data to be transmitted.

HARQ process number: indicates the process number of HARQ.

New data indicator: indicates HARQ initial transmission or retransmission.

Redundancy version: reports the redundancy version of HARQ.

Transmit power control (TPC) command for physical uplink control channel (PUCCH): reports a TPC command for a PUCCH which is an uplink control channel.

The DCI may pass through a channel coding and modulation process, and may be transmitted on a physical downlink control channel (PDCCH) or an enhanced PDCCH (EPDCCH), which is a downlink physical control channel Hereinafter, a technology that transmits or receives a PDCCH or an EPDCCH may be understood as transmission or reception of DCI on a PDCCH or an EPDCCH. Transmission or reception of a physical downlink shared channel (PDSCH) may be understood as transmission or reception of downlink data on a PDSCH.

Generally, the DCI is scrambled with a predetermined radio network temporary identifier (RNTI) (or a cell-RNTI (C-RNTI) which is a terminal identifier), independently for each terminal, a cyclic redundancy check (CRC) is added thereto, and channel coding is performed, whereby each independent PDCCH is configured and transmitted. In the time domain, a PDCCH is mapped and transmitted during the control channel transmission interval. The location where a PDCCH is mapped in the frequency domain may be determined based on the identifier (ID) of each terminal, and may be transmitted over the entire system transmission band.

Downlink data may be transmitted on a PDS CH which is a downlink data transmission physical channel A PDSCH may be transmitted after the control channel transmission interval. The scheduling information such as a detailed mapping location in the frequency domain, a modulation scheme, and the like may be determined based on DCI transmitted via the PDCCH.

Via an MCS in the control information included in the DCI, a base station may report the modulation scheme applied to a PDSCH to be transmitted to a terminal, and the size (transport block size (TBS)) of data to be transmitted. In the embodiment, the MCS may include 5 bits, or may include more or fewer bits than 5 bits. The TBS corresponds to the size of data (transport block (TB)) that a base station desires to transmit, before channel coding for error correction is applied to the data.

The modulation scheme supported by the LTE system includes quadrature phase shift keying (QPSK), 16 quadrature amplitude modulation (16 QAM), and 64 QAM. Modulation orders ($Q_m$) thereof correspond to 2, 4, and 6, respectively. That is, in the case of the QPSK modulation, 2 bits are transmitted per symbol. In the case of the 16 QAM modulation, 4 bits are transmitted per symbol. In the case of 64 QAM modulation, 6 bits are transmitted per symbol. Also, a modulation scheme beyond 256 QAM may be used according to system deformation.

Figure 2:
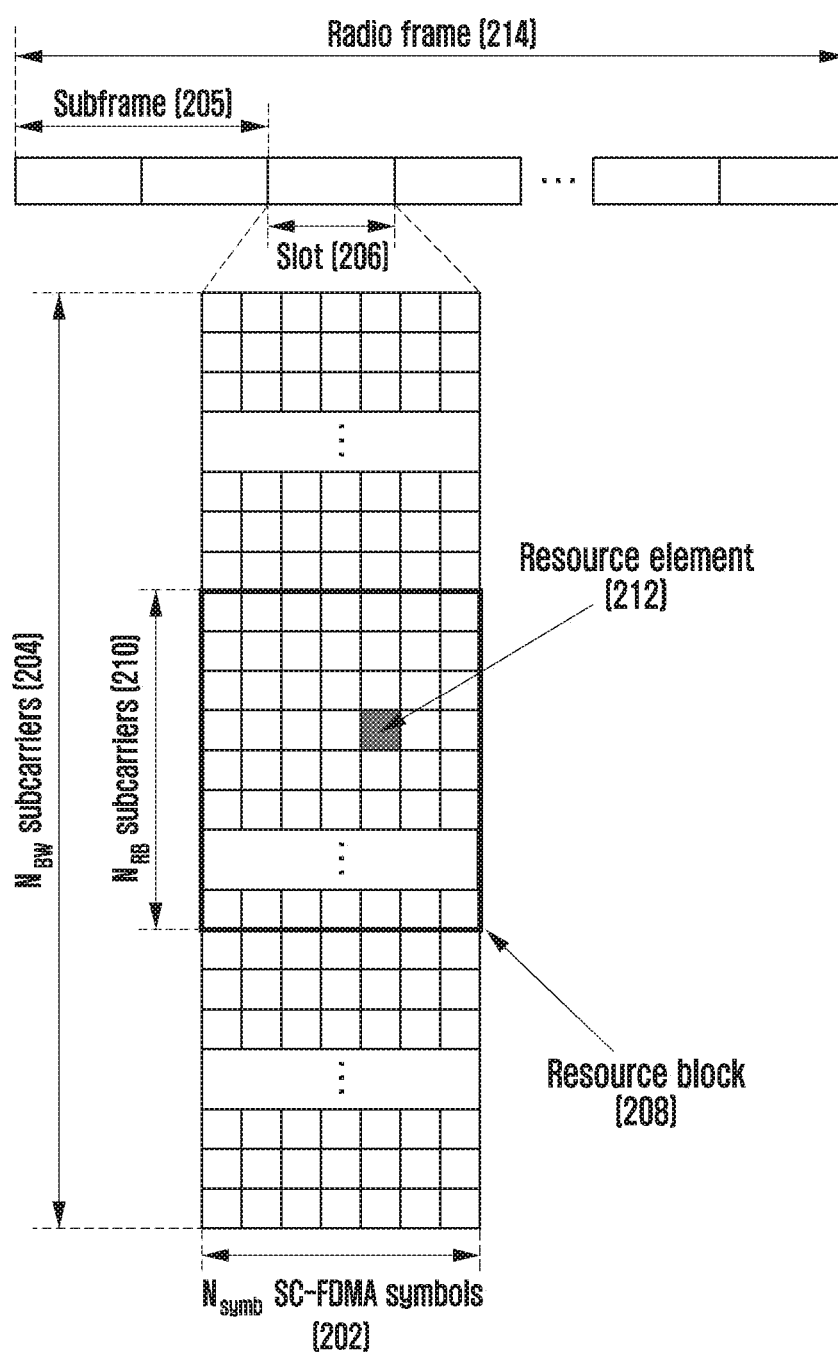
FIG. 2 is a diagram illustrating the structure of a time-frequency domain for uplink transmission in an LTE or LTE-A system.

FIG. 2 is a diagram illustrating the basic structure of a time-frequency domain which is a radio resource region in which data or a control channel is transmitted in an uplink of an LTE and LTE-A system.

In FIG. 2, the horizontal axis indicates the time domain and the vertical axis indicates the frequency domain. The minimum transmission unit in the time domain is an SC-FDMA symbol 202, and a single slot 206 may include $N_{symb}$ SC-FDMA symbols. A single subframe 205 includes two slots. In the frequency domain, the minimum transmission unit is a subcarrier. The entire system transmission bandwidth may include a total of $N_{BW}$ subcarriers 204. $N_{BW}$ may have a value that is proportional to a system transmission band. In the time-frequency domain, a basic resource unit is a resource element (RE) 212, and an RE is defined by an SC-FDMA symbol index and a subcarrier index. A resource block (RB) 208 may be defined by $N_{symb}$ consecutive SC-FDMA symbols in the time domain and $N_{RB}$ consecutive subcarriers in the frequency domain. Therefore, a single RB includes $N_{symb} \times N_{RB}$ REs. Generally, the minimum transmission unit of data or control information is an RB. A PUCCH is mapped to a frequency domain corresponding to 1 RB, and may be transmitted during 1 subframe.

In the LTE system, the timing relationship of a PDSCH, which is a downlink data transmission physical channel, or a PDCCH or EPDCCH, which includes a semi-persistent scheduling release (SPS release), and a PUCCH or PUSCH which is an uplink physical channel which delivers an HARQ ACK/NACK associated with the PDSCH or PDCCH or EPDCCH, may be defined. For example, in the LTE system that operates based on FDD, a HARQ ACK/NACK, which is associated with a PDSCH or a PDCCH or EPDCCH including SPS release transmitted in an n-4$^{th}$ subframe, is transmitted in an n$^{th}$ subframe via a PUCCH or PUSCH.

In the LTE system, a downlink HARQ adapts an asynchronous HARQ scheme in which the point in time for data retransmission is not fixed. That is, when a base station receives a HARQ NACK from a terminal as a feedback for initial transmission data that the base station transmits, the base station freely determines the point in time for retransmission data via a scheduling operation. For the HARQ operation, the terminal performs buffering of data which is determined to be an error according to the result of decoding the reception data, and may combine the buffered data and data retransmitted from the base station. HARQ ACK/NACK information associated with a PDSCH, which is transmitted in subframe n-k, may be transmitted from a terminal to a base station via a PUCCH or a PUSCH in subframe n.

For example, in the case of an LTE FDD system, k is fixed to 4. In the case of a LTE time division multiplexing (LTE TDD) system, a k value is defined in advance for a TDD DL/UL configuration and each subframe number (or subframe index). Also, in the case of the 5G communication system, such as, NR, the k value may be transmitted in DCI that indicates or schedules reception of a PDSCH transmitted in subframe n-k or the k value may be set for a terminal via an upper signal. In this instance, a base station sets one or more k values via an upper signal, and indicates a predetermined k value via the DCI.

In the LTE system, unlike downlink HARQ, uplink HARQ adapts a synchronous HARQ scheme in which the point in time for data transmission is fixed. That is, the uplink/downlink timing relation of a physical uplink shared channel (PUSCH), which is a physical channel for uplink data transmission, a PDCCH, which is a downlink control channel preceding the PUSCH, and a physical hybrid indicator channel (PHICH), which is a physical channel for transmission of a HARQ ACK/NACK associated with the PUSCH, is determined by the rule as follows. When receiving a PHICH that delivers a downlink HARQ ACK/NACK or a PDCCH including uplink scheduling control information transmitted from a base station in subframe n, a terminal transmits uplink data corresponding to the control information via a PUSCH in subframe n+k. In this instance, k is defined differently according to FDD or TDD of the LTE system and a configuration thereof. For example, in the case of the FDD LTE system, k may be fixed to 4. In the case of an LTE TDD system, a k value may be defined in advance for at least one of a TDD DL/UL configuration, each subframe number (or subframe index), the number of data transmission carriers, and the like.

HARQ-ACK information in a PHICH transmitted in subframe i is associated with a PUSCH transmitted in subframe i-k. In the case of the FDD system, k is given as 4. That is, in the FDD system, HARQ-ACK information in the PHICH transmitted in subframe i is associated with a PUSCH transmitted in subframe i-4. In the case of a TDD system, when an enhanced interference mitigation and traffic adaptation (EIMTA) is not configured for a terminal, and when a single serving cell is configured or the same TDD UL/DL configuration is configured for a plurality of serving cells, a k value may be defined in advance for at least one of a TDD DL/UL configuration and each subframe number (or subframe index), the number of data transmission carriers, and the like.

In the case of some LTE systems or the 5G communication system such as NR, uplink HARQ may use an asynchronous HARQ scheme in which the point in time for data transmission is not fixed. Therefore, HARQ ACK/NACK information associated with a PUS CH transmitted in subframe n-k may be determined based on new data indicator (NDI) information included in DCI that a base station transmits via a PDCCH in a subframe n in order to configure a terminal to transmit a PUSCH in n+$k_2$. Alternatively, the base station may inform the HARQ ACK/NACK information associated with the PUSCH transmitted in subframe n-k, of a terminal, via a group common PDCCH or a group common DCI in subframe n.

Although the description about the wireless communication system has been provided with reference to an LTE system, the disclosure is not limited to the LTE system and may be applicable to various wireless communication systems such as NR, 5G, or the like. Also, if the embodiment is applied to other wireless communication systems, k may be changed and applied to a system that uses a modulation scheme corresponding to FDD.

Figure 3:
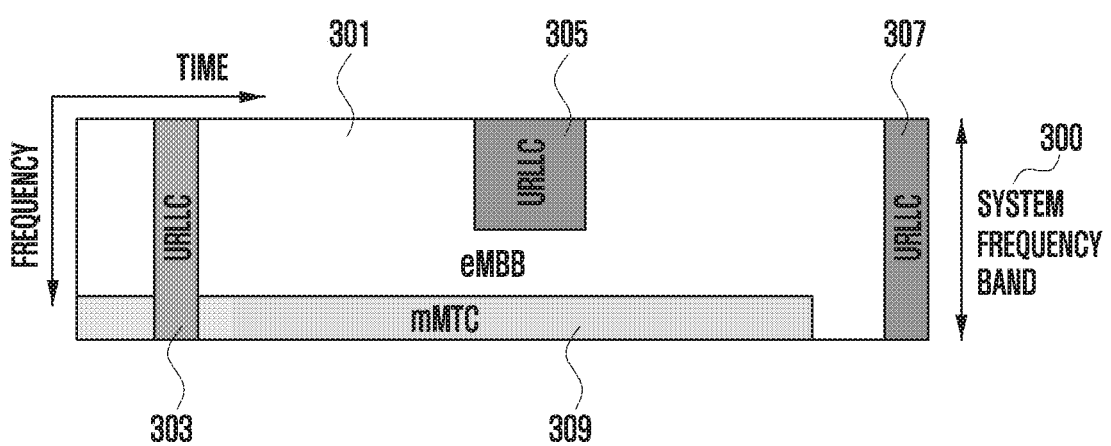
FIG. 3 is a diagram illustrating that data for eMBB, URLLC, and mMTC are allocated in a frequency-time domain in a communication system.

FIG. 3 is a diagram illustrating that data for eMBB, URLLC, and mMTC, which are services considered in 5G or NR systems, are allocated in the frequency-time resources.

Referring to FIG. 3, there is provided a scheme of allocating frequency and time resources for transmitting information in each system.

FIG. 3 illustrates that data for eMBB, URLLC, mMTC has been allocated in the entire system frequency band 300 of FIG. 3. If URLLC data 303, 305, and 307 is generated and needs to be transmitted, while eMBB 301 and mMTC 309 are allocated and transmitted in a predetermined frequency band, a transmitter may evacuate parts in which eMBB 301 and mMTC 309 have been already allocated so as to transmit the URLLC data 303, 305, and 307, or does not perform scheduled transmission so as to transmit the URLLC data 303, 305, and 307. Among the services, URLLC needs to reduce latency, and thus, the URLLC data 303, 305, and 307 may be allocated to a part of the resource 301 in which eMBB has been allocated, and may be transmitted. If URLLC is additionally allocated and transmitted in the resource to which eMBB is allocated, eMBB data may not be transmitted in the overlapping frequency-time resources. Accordingly, the performance of transmission of the eMBB data may be decreased. In this instance, the transmission of the eMBB data may fail due to the allocation of URLLC. Generally, the length of a transmission time interval (TTI) used for URLLC transmission may be shorter than the TTI length used for eMBB or mMTC transmission. Also, the transmitter may transmit a response to information related to URLLC earlier than that of eMBB or mMTC, and thus, information may be transmitted or received with low latency.

Figure 4:
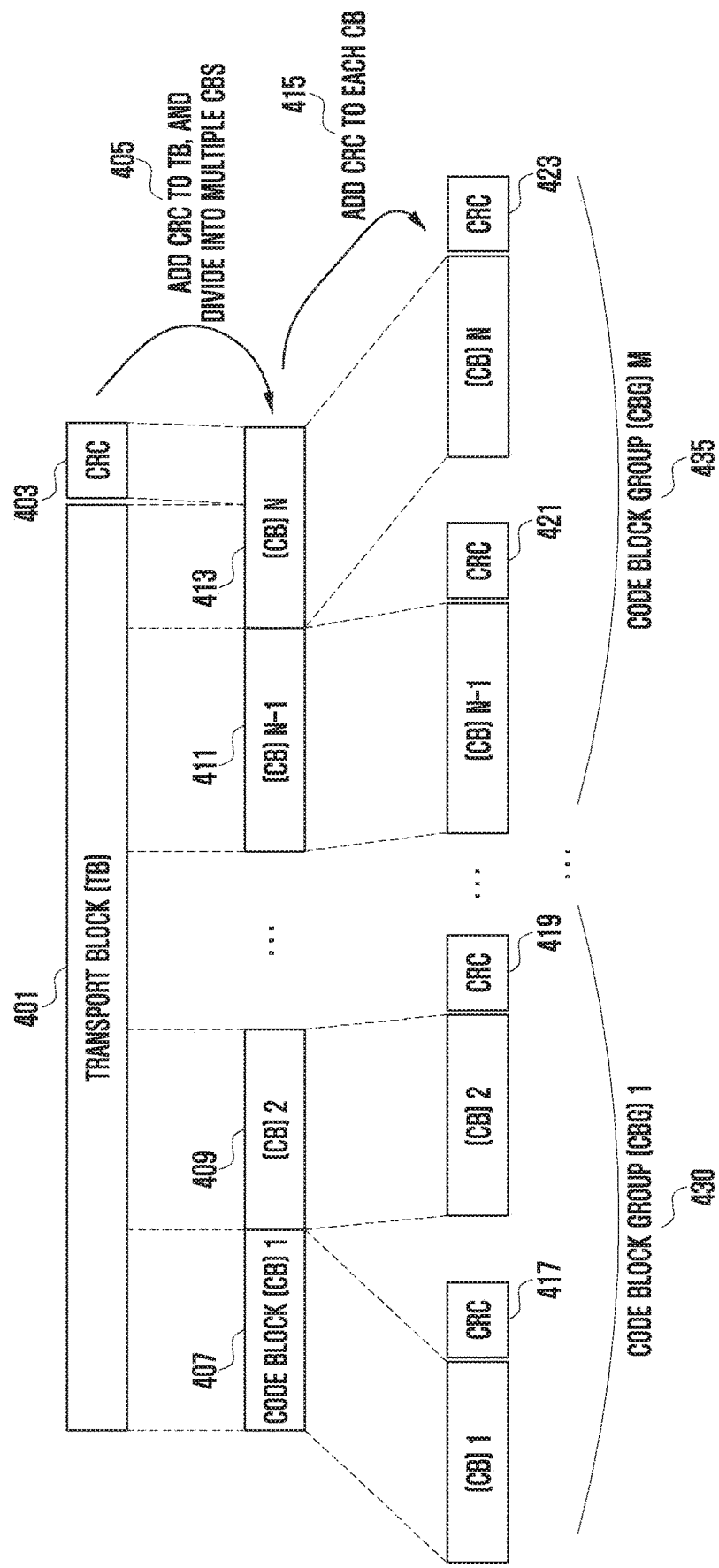
FIG. 4 is a diagram illustrating a method of dividing data signals of a base station and a terminal into code blocks and code block groups.

Data transmitted in a downlink or an uplink, that is, a transport block (TB) or a codeword, may be divided into one or more code blocks (CBs). This will be described with reference to FIG. 4 as follows. FIG. 4 is a diagram illustrating a method of dividing data signals of a base station and a terminal into code blocks and code block groups. In the case of data or a transport block 401 to be transmitted in a downlink or an uplink, a CRC 403 is added to the end or the front of the TB 401, and whether the TB is correctly received may be determined based on the CRC. The CRC may have 16 bits, 24 bits, or a predetermined number of bits, or may have bits, the number of which is variable depending on a channel condition or the like. The CRC may be used for determining whether channel coding is successfully performed. In this instance, a block including a TB and a CRC may be divided into a plurality of code blocks 407, 409, 411, and 413, as shown in diagram 405.

In this instance, the TB is divided based on the maximum code block size defined in advance or the maximum code block size set via an upper signal from a base station. Therefore, at least one code block among the first code block 704 or the last code block 413 may be smaller than the other code blocks. In this instance, 0, a random value, or 1 is added to the first code block 407 or the last code block 413 so that the length of the first or the last code block is equal to those of the other code blocks. CRCs 417, 419, 421, and 423 may be added to the one or more code blocks, respectively, as shown in the diagram 415. The CRC may have 16 bits, 24 bits, or a predetermined number of bits, and may be used for determining whether channel coding is successfully performed. However the CRC 403 added to the TB and the CRCs 417, 419, 421, and 423 added to the code blocks may be omitted depending on the channel code type of a channel code to be added to a code block.

For example, if an LDPC code, instead of a turbo code, is applied to a code block, all or some of the CRCs 417, 419, 421, 423 to be added to code blocks may be omitted. In this instance, the fact that the some CRCs are omitted indicates that the length of a CRC is decreased. However, even though an LDPC code is applied to a code block, the CRCs 417, 419, 421, and 423 may be added to code blocks, as they are. If a polar code is used, a CRC may be added or may be omitted. In this instance, one or more code blocks may configure a code block group (CBG).

In this instance, a base station may perform configuration for a terminal via an upper signal so that the terminal divides a single TB into M code block groups. If the base station sets M as the number of code block groups for a single TB for the terminal via an upper signal, the terminal may group N code blocks divided from the TB into M code block groups 430 and 435. In this instance, the number of code blocks included in a single code block group may be different depending on the size of a TB. In other words, since the number of code blocks is different depending on the size of a TB, the number of code blocks included in a code block group is also different. For example, if a TB is divided into M code blocks, a single code block group may include a single code block. In this instance, the number of code blocks included in a single code block group may be the same as, or different from, each other.

In this instance, according to the configuration, a terminal may determine that a codeword or a TB, which is transmitted or received via a downlink data channel, is divided into one or more code block groups (e.g., M code block groups, M is a positive integer greater than or equal to 1) and is transmitted. In this instance, the terminal may transmit a downlink reception result associated with each of the code block groups (M CBGs) via an uplink control channel, or may transmit the same together with an uplink data channel Alternatively, according to the configuration, a terminal may determine that a codeword or a TB, which is transmitted or received via an uplink data channel, is divided into one or more code block groups (e.g., M code block groups, M is a positive integer greater than or equal to 1) and is transmitted. In this instance, a base station may transmit an uplink data reception result associated with each of the code block groups (M CBGs) via uplink control information that the base station transmits to a terminal in order to configure or schedule uplink data transmission (e.g., indication via NDI toggling), or may transmit the same to a terminal via a separate channel.

In the disclosure, hereinafter, an upper signaling or an upper signal is a signal transferring method in which a base station transmits a signal to a terminal using a downlink data channel of a physical layer, or a terminal transmits a signal to a base station using an uplink data channel of a physical layer. The upper signaling or upper signal may include a signal transferring method such as RRC signaling, PDCP signaling, or a MAC control element (MAC CE).

Although the disclosure is described with reference to a licensed-assisted access (LAA) which is a system that performs downlink or uplink communication in an unlicensed band, the disclosure may be applicable to an FDD system, a TDD system, an NR system, and the like. Additionally, the disclosure may be also applicable to a system (standalone) that operates only in an unlicensed band without the aid of a licensed band.

In the case of the LAA system, a transmission device (a base station or a terminal) that desires to transmit a signal via an unlicensed band performs a channel access procedure (or listen-before talk (LBT)) with respect to an unlicensed band where the communication is performed, before transmitting a signal, and may determine whether the unlicensed band is in an idle state via the channel access procedure. If the unlicensed band is identified as being in the idle state, the transmission device may perform the configured signal transmission. If it is identified that the unlicensed band is not in the idle state via the channel access procedure performed by the transmission device, the transmission device may not be capable of performing the configured signal transmission.

The channel access procedure in the unlicensed band in which the signal transmission is configured may include: receiving, by a transmission device, a signal in the unlicensed band during a predetermined period of time or a period of time calculated according to a predetermined rule (e.g., a period of time calculated using a random value selected by at least a base station or terminal); and comparing, by the transmission device, the intensity of the received signal with a threshold value which is defined in advance or is calculated according to a function including at least one variable among a channel bandwidth, a signal bandwidth in which a desired signal is transmitted, the intensity of transmission power, a beam width of a transmission signal, and the like.

For example, if the intensity of the signal received during 25 us is less than −72 dBm, which is a threshold value defined in advance, the terminal may determine that the unlicensed band is in the idle state, and may perform the configured uplink transmission. In this instance, the maximum available time of the signal transmission may be limited depending on the maximum channel occupancy time, defined for each nation and/or area, in the unlicensed band, or the type of transmission device (e.g., a base station or a terminal, or a master device or slave device). For example, in the case of Japan, a base station or a terminal may continuously occupy a channel and transmit a signal a maximum of 4 ms after performing a channel access procedure in a 5 GHz-unlicensed band, without additional channel access procedure.

Particularly, when a base station or a terminal desires to transmit a downlink or uplink signal in an unlicensed band, types of the channel access procedure that the base station or the terminal may perform are as follows.

Type 1: detects an unlicensed band channel and transmits a downlink or uplink signal during a variable time.

Type 2: detects an unlicensed band channel and transmits a downlink or uplink signal during a fixed time.

Type 3: transmits a downlink or uplink signal without channel detection.

Hereinafter, descriptions will be provided on the assumption that a base station transmits a downlink signal to a terminal in an unlicensed band. However, the disclosure may also be applicable to the case in which a terminal transmits an uplink signal to a base station in an unlicensed band, and the descriptions of the uplink signal transmission will be omitted. Also, descriptions will be provided on the assumption that a base station transmits a single piece of downlink data information (codeword or TB) to a single terminal. However, the disclosure may also be applicable to the case in which a base station transmits a downlink signal to two or more terminals, or the case in which a base station transmits two or more codewords or TBs to the terminal.

A base station that determines that signal transmission in an unlicensed band is needed, may determine a required channel access procedure type depending on the signal type of a signal to be transmitted in the unlicensed band. For example, if the base station desires to transmit a downlink signal including a downlink data channel in the unlicensed band, the base station may perform channel access procedure type 1. Also, if the base station desires to transmit a downlink signal excluding a downlink data channel in the unlicensed band (e.g., transmission of a signal including a synchronization signal or transmission of a downlink control channel), the base station may perform channel access procedure type 2 and may transmit the downlink signal.

In this instance, the channel access procedure type may be determined depending on the transmission length of a signal to be transmitted in the unlicensed band, or depending on the length of a time or a duration during which the unlicensed band is occupied and used. Generally, the channel access procedure type 1 may need a relatively longer period of time to perform a channel access procedure when compared to the channel access procedure type 2. Therefore, if the base station needs to transmit a signal during a short period of time or a period of time less than or equal to a reference period of time (e.g., X ms or Y symbols), the base station may perform the channel access procedure type 2. If the base station needs to transmit a signal during a long period of time or a period of time greater than or equal to a reference period of time (e.g., X ms or Y symbols), the base station may perform the channel access procedure type 1.

In this instance, the channel access procedure type may be determined according to a reference set or defined in advance based on the beam width or the number of beams of a signal to be transmitted in the unlicensed band or a beam width or the number of beams that the base station defines or set for transmission of a downlink signal. Generally, if a large number of beams are used, the beam width of each beam is narrow. When a narrow beam is used, an effect of interference from the transmission of the signal on neighboring nodes is low. Accordingly, the base station may perform a channel access procedure that needs a short period of time. For example, if a beam which is narrower than a reference is used or a larger number of beams than a reference are used to transmit a signal, the base station performs the channel access procedure type 2. If a beam which is wider than a reference is used or a smaller number of beams than a reference are used to transmit a signal, the base station performs the channel access procedure type 1.

If the base station performs the channel access procedure type 1 according to at least one of the references, the base station may determine the channel access priority class for a signal to be transmitted in the unlicensed band, and may perform a channel access procedure using at least one value of the set values defined in association with the determined channel access priority class in advance as shown in Table 1 below. Table 1 below lists the mapping relationship between a channel access priority class and a QCI.

In this instance, the channel access priority class may be selected depending on the quality of service class identifier (QCI) of a signal transmitted in the unlicensed band. For example, QCIs 1, 2, and 4 indicate QCI values for services such as conversational voice, conversational video (live streaming), non-conversational video (buffered streaming), and the like, respectively. If the base station desires to transmit a signal for a service that does not match a QCI of Table 1, the base station may select a QCI which is the most similar to a QCI of Table 1, and may select a channel access priority class.

TABLE 1

| channel Access Priority | QCI |
|---|---|
| 1 | 1, 3, 5, 65, 66, 69, 70 |
| 2 | 2, 7 |
| 3 | 4, 6, 8, 9 |
| 4 | — |

A defer duration, a set ($CW_p$) of contention window values or sizes, the minimum value and maximum value ($CW_{min,p}$ and $CW_{max,p}$) of a contention window, the maximum channel occupancy time ($T_{mcot,p}$), and the like in association with the determined channel access priority (p) may be determined according to Table 2. Table 2 lists the values for each channel access priority class in the case of a downlink. For example, if the base station desires to perform a channel access procedure according to channel access priority class 3 (p=3), the size of a defer duration for the channel access procedure is set based on $T_f + m_p * T_{sl}$, and the duration for an additional channel access procedure after the defer duration may be set to $N*T_{sl}$. In this instance, N is an integer value in the range of 0 to one value ($CW_p$) in the set of contention window values. If it is identified that the unlicensed band is the idle state in the defer duration and the additional channel access procedure duration, the base station may transmit a signal in the unlicensed band during $T_{mcot,p}$.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The base station that desires to transmit a downlink signal in an unlicensed band may perform a channel access procedure with respect to the unlicensed band during at least $T_f + m_p * T_{sl}$. In this instance, the base station does not perform the channel access procedure during $T_f$, and may perform the channel access procedure during $m_p * T_{sl}$ after $T_f$. If it is identified that the unlicensed band is in the idle state via the channel access procedure performed during $m_p * T_{sl}$, the base station may transmit a downlink signal in the unlicensed band during $T_{mcot,p}$.

In this instance, in the case in which an N value is selected by the base station, if it is identified that the unlicensed band is in the idle state via the channel access procedure performed during $m_p * T_{sl}$, it is determined that N=N−1. If it is identified that the unlicensed band is not in the idle state via the channel access procedure performed during $m_p * T_{sl}$, the base station may additionally perform a channel access procedure during $N*T_{sl}$. The initial contention window value ($CW_p$) is the minimum value ($CW_{min,p}$) of a contention window. The base station that selects the N value may perform a channel access procedure every $T_{sl}$, and if the unlicensed band is identified as being in the idle state via the channel access procedure performed every $T_{sl}$, the base station performs changing so that N=N−1, and continuously performs the channel access procedure until N=0. When N=0, the base station transmits a downlink signal in the unlicensed band during $T_{mcot,p}$. If the unlicensed band is identified as not being in the idle state via the channel access procedure performed during $T_{sl}$, the base station performs a channel access procedure with respect to the unlicensed band during $T_f + m_p * T_{sl}$, without changing the N value. If the unlicensed band is identified as being in the idle state via the channel access procedure performed during $m_p * T_{sl}$, the base station performs changing so that N=N−1 and continues the channel access procedure until N=0.

The size of a contention window value ($CW_p$) may be changed or maintained depending on the rate of NACKs to reception results (ACK/NACK) associated with downlink data (received in the reference subframe or reference slot) which are transmitted or reported to the base station by one or more terminals that receive the downlink data transmitted via a downlink data channel in a reference subframe or a reference slot. In this instance, the point in time at which the base station starts a channel access procedure, the point in time at which the base station selects the N value for performing a channel access procedure, or the latest downlink signal transmission interval (or MCOT) during which the base station transmits a downlink signal in the unlicensed band immediately before the two points in time, may be determined to be the reference subframe or reference slot.

Figure 5:
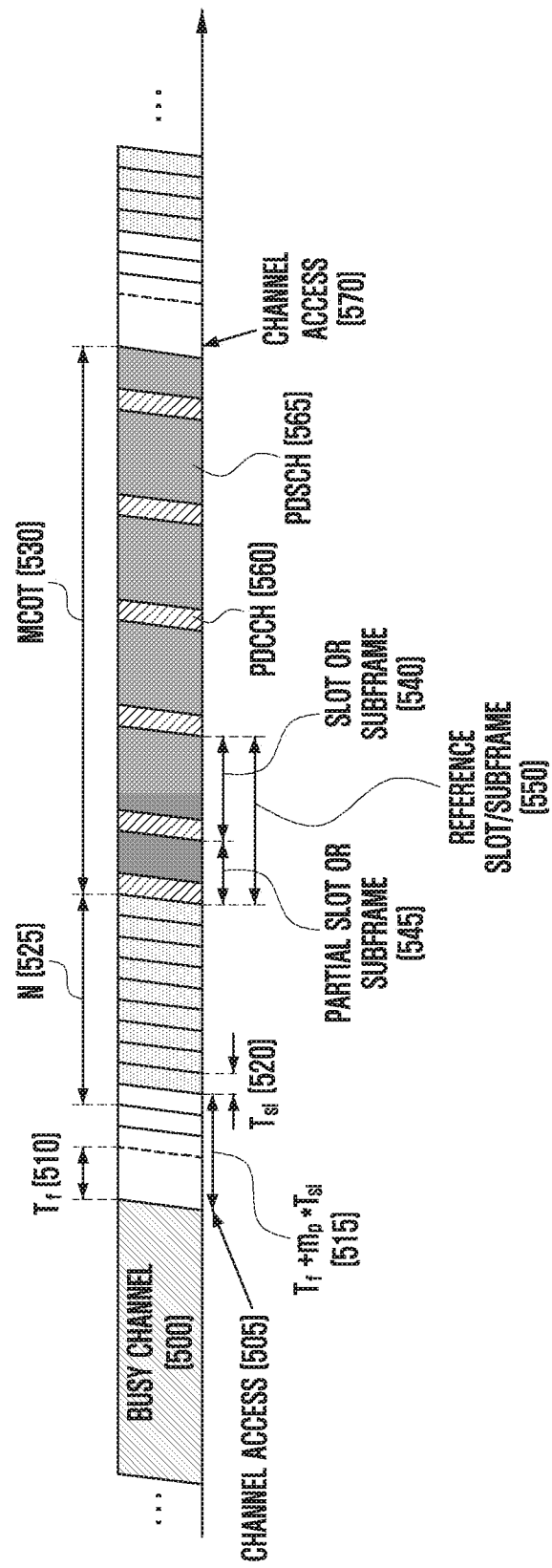
FIG. 5 is a diagram illustrating a channel access procedure in an unlicensed band by a base station and a terminal of the disclosure.

FIG. 5 is a diagram illustrating a channel access procedure in an unlicensed band by a base station and a terminal of the disclosure. Referring to FIG. 5, a point in time 570 at which the base station starts a channel access procedure, a point in time at which the base station selects an N value in order to perform a channel access procedure, or a first subframe 545 and/or 550 of the latest downlink signal transmission interval 530 (maximum channel occupancy time (MCOT)) during which the base station transmits a downlink signal in the unlicensed band immediately before the point in time, may be determined to be a reference subframe (particularly, subframes including a first subframe 550 in which a signal is transmitted among at least all subframes of the downlink signal transmission interval 530 may be defined to be a reference subframe, and if a downlink signal transmission interval starts from a symbol subsequent to a first symbol of a subframe, like the subframe 545, the subframe 545 in which a downlink signal transmission starts and the first subframe 550 in which a signal is transmitted in all subframes may be defined to be a reference subframe). If the rate of NACKs to the reception results associated with the downlink data which are transmitted or reported to the base station by one or more terminals that receive downlink data transmitted via a downlink data channel in the reference subframe, is greater than or equal to Z, the base station may determine a contention window value or size to be used for a channel access procedure 570 to be a contention window which is subsequently larger than a contention window which was used for the previous channel access procedure 505 (in other words, increases a contention window size), and may perform the channel access procedure 570.

In this instance, if the base station does not receive, from a terminal, a reception result associated with downlink data transmitted at the point in time 570 at which a channel access procedure starts, at the point in time at which the base station selects the N value for performing a channel access procedure, or in the reference subframe 545 or 550 immediately before the point in time, the base station may determine the first subframe of the latest downlink signal transmission interval among the reception results associated with the downlink data channels which have been received from the terminals, to be a reference subframe. The base station may determine a contention window size for the channel access procedure 570 using downlink data reception results received from terminals, in association with downlink data transmitted via downlink data channels in the determined reference subframe.

For example, if it is identified that at least 80% of the reception results from a terminal in association with downlink data transmitted to the terminal via a downlink data channel in a first subframe among downlink signals transmitted in the unlicensed band, correspond to a NACK, the base station that transmits a downlink signal via a channel access procedure (e.g., $CW_p=15$) set according to channel access priority class 3 (p=3) may increase the initial contention window value ($CW_p=15$) to a subsequent contention value ($CW_p=31$).

If it is not identified that at least 80% of the reception results from the terminal correspond to a NACK, the base station may maintain a contention window value as it is, or may change the contention window value to an initial contention window value. In this instance, the change of the contention window may be applied to all channel access priority classes in common, or may be applied to only the channel access priority class that is used for the channel access procedure. In this instance, a method of determining a reception result available for determining whether to change the contention window size among reception results associated with downlink data which are transmitted or reported to the base station by the terminal in association with the downlink data transmitted via a downlink data channel in the reference subframe or reference slot, that is, a method of determining a Z value, is as follows.

If the base station transmits one or more codewords or TBs to one or more terminals in the reference subframe or reference slot, the base station may determine a Z value, based on the rate of NACKs to reception results transmitted or reported by the terminals in association with TBs received in the reference subframe or the reference slot. For example, if two codewords or two TBs are transmitted to a single terminal in the reference subframe or the reference slot, the base station may receive downlink data signal reception results transmitted or reported from the terminal, in association with the two TBs. If the rate (Z) of NACKs to the two reception results is greater than or equal to a threshold value defined in advance or a threshold value agreed upon between the base station and the terminal (e.g., Z=80%), the base station may change or increase a contention window size.

In this instance, if the terminal bundles downlink data reception results of one or more subframes (e.g., M subframes) including the reference subframe or slot so as to transmit or report the same to the base station, the base station may determine that the terminal transmits M reception results, and may determine the Z value using the rate of NACKs to the M reception results, and may change, maintain, or initialize a contention window size.

If the reference subframe is a second slot 545 of the two slots in a single subframe, the base station may determine the Z value using the rate of NACKs to reception results transmitted or reported to the base station by the terminal in association with downlink data received in the reference subframe 545 and the subframe 540 subsequent thereto.

Also, the case in which scheduling information or downlink control information associated with a downlink data channel transmitted by the base station is transmitted in a cell or a frequency band, which is the same as a cell or frequency band in which the downlink data channel is transmitted, or the case in which the scheduling information or downlink control information associated with a downlink data channel transmitted by the base station is transmitted via an unlicensed band but they are transmitted in a cell or frequency band which is different from the cell or frequency band in which the downlink data channel is transmitted, may be considered. If it is determined that the terminal does not transmit a reception result associated with downlink data received in the reference subframe or reference slot, and if it is determined that a reception result transmitted by the terminal in association with the downlink data corresponds to discontinuous transmission (DTX) or NACK/DTX, or any state, the base station may determine the reception result from the terminal to be a NACK, and may determine the Z value.

Also, if scheduling information or downlink control information associated with a downlink data channel transmitted by the base station is transmitted in a licensed band, or if it is determined that the reception result transmitted by the terminal in association with the downlink data corresponds to DTX, NACK/DTX, or any state, the base station may not take into consideration the reception result from the terminal when determining Z which is a reference value for changing a contention window. In other words, the base station may determine the Z value by disregarding the reception result from the terminal.

Also, if the base station transmits scheduling information or downlink control information associated with a downlink data channel via a licensed band, or if downlink data reception results of the reference subframe or reference slot which are transmitted or reported to the base station by the terminal includes a reception result associated with downlink data that the base station actually does not transmit (no transmission), the base station may determine the Z value by disregarding the reception result transmitted or reported by the terminal in association with the downlink data.

The base station may perform configuration for the terminal via an upper signal so that downlink data or a codeword or TB transmitted from the base station via a downlink data channel is divided into M code block groups (M is a positive integer greater than or equal to 1). In this instance, the number of code block groups (M CBGs) divided from the codeword or TB may be configured for the terminal by the base station via an upper signal. If one or more codewords or TBs are transmitted, the terminal may determine that each codeword or TB is divided into one or more code block groups (M CBGs). In this instance, the base station may independently set the number of code block groups for each codeword or TB.

In this instance, the terminal may be configured, by the base station via an upper signal, to transmit a reception result associated with each code block group of received downlink data to the base station via an uplink control channel, or to transmit the same together with an uplink data channel. For example, the terminal configures a reception result associated with the received downlink data as a reception result associated with each of M codeword groups, and may transmit or report the same to the base station. In this instance, the reception result associated with the downlink data may be transmitted or reported to the base station via a bit stream having the size of M or a bit stream smaller than M.

In other words, when a codeword or a TB transmitted from the base station via a downlink data channel is divided into M code block groups for the transmission, and the terminal that receives the signal is configured to transmit a reception result associated with a code block group(s) to the base station, a detailed method of determining the Z value may be needed.

First Embodiment

A terminal is configured, by a base station via an upper signal, to determine that downlink data transmitted via a downlink data channel is transmitted by being divided into M code block groups, and the terminal may transmit or report, to the base station, a reception result for each code block group as a downlink data reception result. In this instance, the terminal may transmit or report the downlink data reception result to the base station using an M-bit stream via an uplink control channel or an uplink data channel. For example, the terminal, which is configured by the base station to determine that a single codeword or TB is divided into M code block groups, may receive the codeword or TB, and may transmit reception results associated with the M code block groups to the base station using M-bit stream information. In this instance, M-bit stream information may sequentially include from a code block group number or a code block group index having a small value. In this instance, the number of bits of a downlink data reception result from the terminal may be configured by the base station via an upper signal, or may be determined to be the same as the number of code block groups of downlink data configured by the base station.

If the downlink data that the terminal receives includes two or more codewords or TBs, the terminal may transmit or report reception results associated with code block group of each codeword or TB to the base station. In this instance, reception results associated with code block groups having the same code block group number or index for the code words or TBs may be bundled (bundling or bit-OR operation) and may be transmitted or reported to the base station. Also, the terminal may transmit or report code block group-based reception results and a reception result associated with a codeword or TB to the base station as the downlink data reception result.

The base station transmits only a few code block groups (e.g., k code block groups (K<M)) among M code block groups of the codeword or TB. For example, the base station may transmit, to the terminal, M code block groups of an initially transmitted codeword or TB. The terminal that receives the M code block groups may report, to the base station, that the terminal fails (NACK) to receive K code block groups among the M received code block groups, and successfully receives (ACK) M-K code block groups. The base station, which receives the reception result associated with the downlink data from the terminal, may retransmit data associated with the K code block groups which the terminal fails to receive. In this instance, downlink control information (DCI) or scheduling information that indicates reception of a downlink data channel to the terminal may include an indicator indicating the index of a code block group that is actually transmitted (e.g., an M-bit indicator), such as a code block group transmission indicator. Based on the code block group transmission indicator, the terminal may receive a code block group and a data signal corresponding thereto transmitted from the base station.

Alternatively, it is assumed that the terminal is configured, by the base station, to determine that a single codeword or TB is divided into M code block groups, and to transmit reception results associated with the M configured code block groups, irrespective of the number of code block groups actually transmitted. If the base station actually transmits K code block groups (K<M) via a downlink data channel, the terminal decodes the actually transmitted K code block groups and transmits the determined actual reception result information. In the case of the reception results associated with the M-K code block groups which are not actually transmitted in association with the codeword or TB, the terminal matches a reception result defined in advance between the base station and the terminal among downlink data reception result information including an ACK, a NACK, and a DTX, and transmits the same to the base station, or the terminal randomly selects one of the downlink data reception result information and transmits the same to the base station. For example, the terminal may set an ACK for a code block group that was transmitted in a previous transmission among the M-K code block groups which are not actually transmitted in association with the codeword or TB, or for a code block group which was reported as being successfully received (ACK) by the terminal among the previously transmitted code block groups, and may transmit the ACK to the base station.

Therefore, the base station, which receives a downlink data reception result transmitted or reported from the terminal as described above, may determine whether to change a contention window size used for performing a channel access procedure by disregarding predetermined information among reception results reported by the terminal or by using some of the reception results, according to the method as follows.

Method 1: determines a Z value based on code block group-based reception results.

The method 1 is a method in which a base station determines or calculates a Z value using each code block group-based reception result which is reported by a terminal when the terminal reports a reception result associated with a code block group to the base station as a reception result associated with received downlink data. For example, in the case of a terminal which is configured, by the base station via an upper signal, to determine that a single codeword or TB is divided into M code block groups, the terminal may be defined or configured in advance to report reception results associated with M code block groups to the base station as a reception result associated with the configured codeword or TB, irrespective of the number of code block groups that are actually transmitted in association with the codeword or TB. In this instance, if the terminal receives a single TB transmitted via a downlink data channel in a reference subframe or reference slot for determining whether to change a contention window, and transmits or reports data signal reception results associated with M code block groups to the base station as a reception result associated with the TB, the base station may determine a Z value for changing a contention window value or a contention window size using the number of NACKs among the reception results associated with the M code block groups.

This will be described with reference to a detailed example. If at least Z (%) of the reception results associated with the M code block groups corresponds to a NACK (i.e., the number of code block groups corresponding to NACK/M), the base station increases a contention window size for a channel access procedure, or may change the current contention window size to a subsequently larger contention window size in the set of contention window sizes. If it is different from the case in which Z (%) of the reception results associated with the M code block groups corresponds to a NACK, the base station may maintain the current contention window size or may change the contention window size to an initial value. In this instance, in the case in which downlink data is transmitted to one or more terminals or one or more codewords or TBs are transmitted to a terminal in the reference subframe or reference slot, the base station determines the Z value using all reception results, which are received or reported from the terminals in association with the downlink data transmitted in the reference subframe and reference slot, and may maintain or change a contention window size.

In this instance, the base station may maintain or change the contention window size using reception results associated with the K code block groups that the terminal reports to the base station in association with the K code block groups that are actually transmitted to the terminal via a downlink data channel in the reference subframe or reference slot. For example, if the base station actually transmits K (K<M) code block groups via a downlink data channel, the terminal may decode the actually transmitted K code block groups and may transmit the determined actual reception result information. In the case of the reception results associated with the M-K code block groups that are not actually transmitted, the terminal matches a reception result (e.g., a NACK) defined in advance between the base station and the terminal among downlink data channel reception result information (e.g., a NACK/DTX, any, no transmission, and the like), and transmits the same to the base station, or the terminal randomly selects one of the downlink data channel reception result information and transmits the same to the base station.

In this instance, the base station may determine whether to change a contention window size using the reception results associated with actually transmitted code block groups among the reception results associated with the M code block groups. In other words, the base station may disregard the reception results associated with M-K code block groups which are not actually transmitted among the reception results associated with the M code block groups, and may determine whether to change a contention window size using the reception results associated with K code block groups which are actually transmitted. For example, the base station, which receives a reception result associated with a codeword or TB transmitted via a downlink data channel in the reference subframe or reference slot, may increase a contention window size when at least Z % of the reception results, which are reported by the terminal in association with K code block groups that the base station actually transmits among the reception results, corresponds to a NACK. If it is different from the case in which Z (%) of the reception results associated with the K code block groups corresponds to a NACK, the base station may maintain a contention window size or may change the contention window size to an initial value.

The method of determining a Z value for changing a contention window size may be applicable to the case in which a terminal is configured, by a base station via an upper signal, to determine that a single codeword or TB is divided into M code block groups, and is defined or configured in advance to report, to the base station, only a reception result associated with an actually transmitted code block group in association with the codeword or TB.

There may be a case in which a base station performs another downlink data channel transmission using a few time and frequency resources among downlink data channel transmission time and frequency resources of the reference subframe or slot. In other words, if a few time and frequency resource regions 303, 305, and 307 are punctured (puncturing) in a time and frequency resource region 301 in which a downlink data channel 301 is transmitted to a predetermined terminal (e.g., an eMBB terminal) in the reference subframe or slot as illustrated in FIG. 3, and the base station transmits another downlink data channel 303, 305, or 307 to the eMBB terminal or another terminal (e.g., a URLLC terminal) in the areas, the terminal may not correctly receive the data transmitted in a code block or code block group including the punctured part. In other words, the terminal may have a high probability of transmitting a NACK to the base station as a reception result associated with the code block group.

In this instance, the reception result associated with the code block group is not a reception failure occurring due to a collision with, or interference by, devices using the unlicensed band, but a result occurring since the base station transmits another downlink data channel. Accordingly, the base station may disregard a downlink data channel reception result reported by the terminal in association with "a punctured area for transmitting another downlink data channel", "a code block including a punctured area", "a code block group including a code block including a punctured area", or "a TB including a punctured area", and may not take into consideration the reception result associated therewith when calculating a Z value for changing a contention window. Alternatively, the base station may take into consideration a downlink data channel reception result reported by the terminal in association with a punctured area for transmitting another downlink data channel, a code block including a punctured area, a code block group including a code block including a punctured area, or a TB including a punctured area, when calculating the Z value for changing a contention window.

In this instance, if the terminal transmits or reports, to the base station, reception results associated with downlink data received in one or more subframes or slots (e.g., X subframes) including the reference subframe or slot by bundling the same, or if the terminal transmits or reports, to the base station, reception results associated with two or more pieces of downlink data (e.g., X TBs) received in the reference subframe or slot by bundling the same, the base station may determine that the terminal transmits X*M reception results, and determines the Z value using the rate of NACKs to the X*M reception results, and may change or maintain or initiate a contention window size.

If the terminal reports, to the base station, code block group-based reception results and a reception result associated with a codeword or TB in association with downlink data received in the reference subframe or reference slot, the base station may determine a Z value for changing a contention window using both the code block group-based reception results and the reception result associated with the codeword or TB, or may disregard the reception result associated with the codeword or TB, and may determine a Z value for changing a contention window using the code block group-based reception results.

Method 2: determines a Z value using code block group-based reception results or using an assumed codeword or TB-based reception result.

The method 2 is a method in which, when a terminal reports, to a base station, a reception result associated with a code block group as a reception result associated with a codeword or a TB, the base station determines a ZTB value using the reception result associated with the code block group which is reported by the terminal, and determines a Z value for determining whether to maintain or change a contention window size based on the determined ZTB.

For example, in the case in which a single codeword or TB is configured, by the base station via an upper signal, to be divided into M code block groups, the terminal may be defined or configured in advance to report reception results associated with the M configured code block groups to the base station, irrespective of the number of code block groups that are actually transmitted from the base station in association with the codeword or TB. In the case in which the terminal receives a single TB via a downlink data channel transmitted in a reference subframe or reference slot for determining whether to change a contention window, and transmits data signal reception results associated with M code block groups to the base station as a reception result associated with the TB, if at least $Z_{TB}(\%)$ of the reception results associated with the M code block groups corresponds to a NACK, the base station may determine or assume that transmission of the codeword or TB fails (NACK), and determine an Z value for changing a contention window value or a contention window size.

In this instance, the Z value and the ZTB value may be defined in advance between the base station and the terminal, or may be configured by the base station via an upper signal. A detailed example will be described by assuming that ZTB=100. If at least one of the reception results, which are associated with the M code block groups of downlink data transmitted in the reference subframe or reference slot, and are reported from the terminal, corresponds to an ACK, or if it is different from the case in which all of the reception results associated with the M code block groups correspond to a NACK, the base station determines or assumes (ACK) that a codeword or TB transmitted in the reference subframe or reference slot is correctly received by the terminal, and may determine a Z value.

Similarly, if one of the reception results, which are associated with the M code block groups of downlink data transmitted in the reference subframe or reference slot, and are reported from the terminal, corresponds to a NACK, or if it is different from the case in which all of the reception results associated with the M code block groups correspond to an ACK, the base station determines or assumes (NACK) that a codeword or TB transmitted in the reference subframe or reference slot is not correctly received by the terminal, and may determine a Z value.

In this instance, the base station determines whether the transmission of the codeword or TB is successfully performed or fails, and the information is used for determining a Z value for determining whether to change a contention window value or a contention window size. Also, the information may be independent from determining, by the base station, a reception result associated with the codeword or TB reported from the terminal. For example, when the base station determines a Z value for determining whether to change a contention window value or a contention window size, it may be assumed that a terminal's reception result associated with downlink data in the reference subframe or reference slot is an ACK. However, a terminal's reception result associated with the codeword or TB may be actually a NACK. In this instance, the base station may retransmit the entirety of the codeword or TB, or a few code block groups (e.g., a code block group which is reported by the terminal as corresponding to a NACK).

The base station may determine $Z_{TB}$ for determining whether to change a contention window size using terminal's reception results associated with K code block groups that actually are transmitted via a downlink data channel in the reference subframe or reference slot. For example, if the base station actually transmits a data signal associated with K (K<M) code block groups via a downlink data channel, the terminal may decode the data associated with the actually transmitted K code block groups and may transmit the determined actual reception result information to the base station. In this instance, in the case of reception results for the data associated with the M-K code block groups that are not actually transmitted, the terminal matches a reception result defined in advance between the base station and the terminal among downlink data channel reception result information (e.g., NACK/DTX, any, no transmission, and the like) including an ACK, a NACK, and a DTX, and transmits the same to the base station, or the terminal randomly selects one of the downlink data channel reception result information and transmits the same to the base station.

In this instance, the base station may determine a Z value for determining whether to change a contention window size using reception results associated with actually transmitted code block groups (K) among the reception results associated with the M code block groups. In other words, the base station may disregard the reception results associated with the M-K code block groups which are not actually transmitted among the reception results associated with the M code block groups, and may determine whether to change a contention window size using the reception results associated with the K code block groups which are actually transmitted.

Particularly, the base station, which receives a reception result associated with a codeword or TB transmitted via a downlink data channel in the reference subframe or reference slot, may disregard the reception results reported by the terminal in association with the M-K code block groups which the base station does not transmit to the terminal, in the reception result associated with the codeword or TB. If at least $Z_{TB}$(%) of the reception results, reported by the terminal in association with the K code block groups that the base station actually transmits, corresponds to a NACK, the base station determines or assumes that transmission of the codeword or TB fails (NACK) and determines a Z value for changing a contention window or a contention window size. In the case in which $Z_{TB}$=100, if at least one of the reception results, which are associated with the K code block groups and are reported from the terminal, corresponds to an ACK, or if it is different from the case in which all of the reception results associated with the K code block groups correspond to a NACK, the base station may determine or assume (ACK) that the terminal correctly receives the codeword or TB transmitted in the reference subframe or reference slot, and may determine or calculate a Z value.

In this instance, the base station determines whether the transmission of the codeword or TB is successfully performed or fails, and the information is used for determining a Z value for determining whether to change a contention window value or a contention window size. Also, the information may be independent from determining, by the base station, a reception result associated with the codeword or TB reported from the terminal. For example, although the base station assumes ACK when determining a Z value for determining whether to change a contention window value or a contention window size, the base station may determine that a terminal's reception result associated with the codeword or TB is actually a NACK and may retransmit the entirety of the codeword or TB or a few code block groups (e.g., a code block group reported by the terminal as corresponding to a NACK).

The method of determining a Z value for changing a contention window size may be applicable to the case in which a terminal is configured, by a base station via an upper signal, to determine that a single codeword or TB is divided into M code block groups and to report, to the base station, only a reception result associated with an actually transmitted code block group in association with the codeword or TB.

There may be a case in which a base station performs another downlink data channel transmission using a few time and frequency resources among downlink data channel transmission time and frequency resources of the reference subframe or slot. In other words, if a few time and frequency resource regions 303, 305, and 307 are punctured (puncturing) in the time and frequency resource region 301 in which the downlink data channel 301 is transmitted to a predetermined terminal (e.g., an eMBB terminal) in the reference subframe or slot as illustrated in FIG. 3, and the base station transmits another downlink data channel 303, 305, or 307 to the eMBB terminal or another terminal (e.g., URLLC terminal) in the areas, the terminal may not correctly receive the data transmitted in a code block or code block group including the punctured part.

In other words, the terminal may have a high probability of transmitting a NACK to the base station as a reception result associated with the code block group. In this instance, the reception result associated with the code block group is not a reception failure occurring due to a collision with, or interference by, devices using the unlicensed band, but a result occurring since the base station transmits another downlink data channel. Accordingly, the base station may disregard a downlink data channel reception result reported by the terminal in association with a punctured area for transmitting another downlink data channel, a code block including a punctured area, a code block group including a code block including a punctured area, or a TB including a punctured area, and may not take into consideration the reception result associated therewith when calculating a Z value for changing a contention window. Alternatively, the base station may take into consideration a downlink data channel reception result reported by the terminal in association with a punctured area for transmitting another downlink data channel, a code block including a punctured area, a code block group including a code block including a punctured area, or a TB including a punctured area, when calculating the Z value for changing a contention window.

If the terminal reports, to the base station, code block group-based reception results and a reception result associated with a codeword or TB in association with downlink data received in the reference subframe or reference slot, the base station may not compare the rates of NACKs to the code block group-based reception results with Zm, that is, the base station disregards the code block group-based reception results reported by the terminal, and may determine a Z value for changing a contention window using the reception result associated with the codeword or TB.

Second Embodiment

If a terminal receives an uplink transmission configuration or uplink scheduling information (hereinafter, a UL grant) transmitted from a base station via a downlink control channel, and the terminal proceeds with channel access procedure type 1 according to channel access priority class p in order to transmit an uplink signal in an unlicensed band according to the UL grant, the terminal may maintain or change a contention window ($CW_p$) according to Table 3 below. Table 3 below lists a defer duration, a set ($CW_p$) of contention window values or sizes, and the minimum value and maximum value ($CW_{min,p}$ and $CW_{max,p}$) of a contention window, the maximum channel occupancy time ($T_{ulmcot,p}$), and the like in association with a channel access priority class.

TABLE 3

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

TABLE 3-continued

In this instance, if it is configured that other devices do not exist in the unlicensed band (absenceOfAnyOtherTechnology-r14=TRUE), for p=3, 4 via an upper signal, $T_{ulmcot,p}$ may be 10 ms. Also, if $T_{ulmcot,p}$ is 6 ms, $T_{ulmcot,p}$ may be increased to 8 ms by adding one or more gaps, the size of each gap being a minimum of 100 us. In this instance, the length of the maximum occupancy time is 6 ms before the gap is added.

If the terminal receives an uplink transmission configuration or uplink scheduling information (hereinafter, a UL grant), which is scrambled with a terminal's unique identifier (C-RNTI) and is transmitted from the base station via a downlink control channel, at least one of HARQ process IDs indicated by the received UL grant is HARQ_ID_ref, and a new data indicator (NDI) for the HARQ_ID_ref is toggled (toggling), the terminal may initialize a contention windows for each channel access priority class. In other words, $CW_p = CW_{min,p}$, p=1, 2, 3, 4. In this instance, P indicates a channel access priority class, and the terminal may receive a P value indicated by the base station via the UL grant. If at least one of the HARQ process IDs indicated by the received UL grant is HARQ_ID_ref, and a new data indicator (NDI) for the HARQ_ID_ref is not toggled, or when the NDI is set to a value indicating retransmission, the terminal may increase the current contention window value to a subsequently larger contention window value.

In this instance, a HARQ process ID associated with uplink data transmitted in a subframe or slot ($n_w$) in which uplink data is transmitted after the latest channel access procedure type 1 is performed, among subframes or slots in which the terminal transmits uplink data, based on a subframe or slot ($n_g$-k) which exists K subframes or slots earlier than the subframe or slot ($n_g$) in which the terminal receives the UL grant, is the HARQ_ID_ref. In this instance, in the case in which the terminal continuously transmits uplink data in a plurality of subframes or slots (i.e., transmits uplink data in $n_0, n_1, \ldots n_{w-1}$, and $n_w$) including the subframe or slot ($n_w$) in which the uplink data is transmitted after latest channel access procedure type 1 is performed, if an uplink signal is transmitted in all symbols included in the duration where the uplink data is transmitted, the HARQ process ID associated with uplink data transmitted in the first subframe or slot (no) of the uplink transmission interval is the HARQ_ID_ref.

In this instance, the terminal that receives an indication to perform the channel access procedure type 1 via the UL grant may determine a contention window value to be used for performing the channel access procedure type 1 based on the point in time at which the UL grant is received, and the determined contention window value may be maintained for the uplink data channel transmission configured by the UL grant, without a change. In other words, although the terminal determines a contention window value ($CW_{p1}$) at the point in time at which UL grant 1 is received, if the terminal receives another UL grant 2 before transmitting uplink data (PUSCH 1) configured by the UL grant 1 after the point in time at which the UL grant 1 is received, the terminal may determine a contention window value ($CW_{p2}$) to be used for performing the channel access procedure type 1 based on the point in time at which the UL grant 2 is newly received. In this instance, the contention window ($CW_{p2}$) may be maintained or changed by the terminal based on the previous contention window value ($CW_{p1}$), but $CW_{p1}$ is independent from the UL grant 2.

If the uplink data, or a codeword or TB, which is transmitted by the terminal via an uplink data channel is divided into code block groups (hereinafter, being interchangeably used with CBGs), and the base station transmits or reports, to the terminal, a reception result associated with each CBG as a reception result associated with the uplink data, the terminal may determine the reception result associated with the uplink data using at least one of method 1 or method 2 of the first embodiment. For example, the terminal may transmit a CBG, which the base station configures or requests via the UL grant that the terminal receives from the base station. If the terminal is configured, by the base station, to divide uplink data, or a codeword or TB into M code block groups, and to transmit the same via an uplink data channel, the base station may transmit a UL grant for configuring initial uplink data transmission to the terminal so as to schedule uplink data transmission.

In this instance, a transmission indicator for the M code block groups may be included in the UL grant. For example, the base station may indicate transmission of all of the M code block groups for the initial transmission, and the transmission indicator may be configured based on toggling. If the transmission indicator is configured based on toggling, the transmission indicator for the initial transmission may be one of 0 or 1. In this instance, the transmission indicator may directly indicate initial transmission or retransmission of the M code block groups. For example, 0 indicates initial transmission, and 1 indicates retransmission.

The base station may set the transmission indicator values for the M code block groups to 0 via a UL grant, so that the terminal performs initial transmission of all code block groups. The base station that receives the configured uplink data transmission may transmit or report a reception result to the terminal via a UL grant. In this instance, the base station may set (toggling) a transmission indicator value to 1 as a reception result (ACK) associated with a code block group that is correctly received among the reception results associated with the M code block groups, and may set a transmission indicator value to 0 as a reception result (NACK) associated with a code block group that is not correctly received, so that the terminal retransmits a few code block groups.

If the base station, which receives the retransmitted uplink data, correctly receives all of the retransmitted code block groups, the base station sets (toggling) all of the transmission indicator values of a UL grant that configures the terminal to transmit new uplink data, to 1, so as to inform the terminal that the base station correctly receives the previously transmitted uplink data, and at the same time, to configure new uplink data transmission for the terminal. Therefore, the terminal determines a base station's reception result associated with uplink data corresponding to the HARQ_ID-ref, and may determine whether to change a contention window.

In other words, the terminal compares transmission indicator values of a received UL grant with transmission indicator values of a UL grant that configures initial uplink data transmission which has been performed, and may initialize a contention window if all of the M transmission indicator values are toggled. The terminal compares the transmission indicator values of the received UL grant with transmission indicator values of the UL grant that configures initial uplink data transmission which has been performed, and if $Z_{TB}$ of the M transmission indicator values (e.g., $Z_{TB}$=100% or $Z_{TB}$=the number of code block groups corresponding to a NACK/M) are not toggled, the terminal may increase a contention window for each channel access priority class (p) to a contention window value which is subsequently larger than the current value among $CW_p$ of Table 3. In this instance, the method of maintaining or changing a contention window based on code block group-based uplink data information reception results of the base station, may comply with at least one of method 1 or method 2 of the first embodiment.

An uplink transmission scheme, which may transmit uplink data without receiving a UL grant, may be configured by an upper signal, in addition to the uplink transmission scheme in which the terminal receives a UL grant, which is scrambled with a C-RNTI, from the base station, performs the channel access procedure type 1, and transmits uplink data. In this instance, in the upper signal, resource information which may transmit uplink data without receiving a UL grant may be included, for example, period information and RNTI information (e.g., grant-free-RNTI or grant-free-SPS-RNTI). In this instance, the terminal receives a DCI, which is scrambled with an RNTI configured via an upper signal, from the base station, and may activate a transmission scheme that may transmit uplink data without reception of the configured UL grant. In this instance, the terminal may receive an indication or a configuration associated with a resource capable of transmitting uplink data without receiving a UL grant, using at least one piece of information among a subframe index or slot index in which the DCI is transmitted, time resource information such as a timing offset included in the DCI, frequency resource allocation information, and period information configured via the upper signal. In this instance, the terminal performs channel access procedure type 1, and transmits uplink data in the configured resource without receiving a UL grant.

In this instance, the base station performs channel access procedure type 1 or type 2, and may transmit, to the terminal, information associated with a subframe or slot in which uplink data transmission is allowed, directly or indirectly via a DCI scrambled with a terminal-common control channel (common PDCCH (C-PDCCH)) or a common control RNTI (CC-RNTI) via the unlicensed band, without transmission of a UL grant. The terminal which receives the information performs the channel access procedure type 2 in the subframe or slot, and may transmit uplink data in a resource configured by the upper signal and the DCI transmitted for activation, without reception of a UL grant.

In this instance, the number of subframes or slots in which the terminal continuously transmits uplink data without reception of a UL grant may be determined using a number-of-scheduled-subframes field or a channel access priority class field scheduled in the DCI field transmitted for activation. If the two fields are included in the DCI field transmitted for activation, the terminal may preferentially use the number-of-scheduled-subframes field. Also, generally, the channel access priority class field is used by the base station to indicate set values to be used when the terminal performs the channel access procedure type 1, in other words, p values in Table 3. However, when the terminal performs the channel access procedure type 2, the channel access priority class field indicates a p value used when the base station performs the channel access procedure type 1.

In this instance, in the case in which the terminal performs channel access procedure type 2 and transmits uplink data without a UL grant, it is determined that the channel access priority class field indicates the number of subframes or slots in which the terminal continuously transmits uplink data without reception of a UL grant, and the number of subframes or slots may correspond to a $T_{ulmcot,p}$ value of Table 3, or a new value may be configured for each p. For example, p=1, 2, 3, 4, which are channel access priority class values may be respectively defined or configured in advance via an upper signal, to indicate 1, 2, 3, and 4 subframes or slots, that is, the number of subframes or slots, in which the terminal continuously transmits uplink data without receiving a UL grant. In this instance, the value associated with a subframe or slot may be merely an example.

For example, the terminal may determine the index of a subframe or slot in which the terminal transmits uplink data without reception of a UL grant, as follows.

(10*SFN+subframe)=[(10*SFN_start_time+subframe_start_time)+N*Interval]modulo 10240

In this instance, SFN_start_time and subframe_start_time indicate an SFN and subframe or slot time or index information in which DCI for activation of a configuration that transmits uplink data without a UL grant is transmitted. Alternatively, the subframe_start_time indicates a subframe or slot which exists a timing offset (or a PUSCH transmission timing set value), indicated by the DCI, distant from the subframe or slot in which the DCI is transmitted. Alternatively, the subframe_start_time may be a value obtained by performing the modulo operation on the number of subframes or slots included in an SFN. Alternatively, the SFN_start_time indicates an SFN value including a subframe or slot which exists a timing offset (or a PUSCH transmission timing set value), indicated by the DCI, distant from the subframe or slot in which the DCI is transmitted.

If the terminal is configured to perform channel access procedure type 1 and to transmit uplink data in the configured uplink data transmission resource without reception of a UL grant, and activation thereof is performed, the terminal may determine a HARQ_ID_ref according to the following method. Also, the terminal, which receives a UL grant scrambled with a C-RNTI from the base station, and receives an indication to perform channel access procedure type 1 via the UL grant, may determine a contention window value for the channel access procedure type 1 based on the point in time at which the UL grant is received according to the following method.

Figure 6:
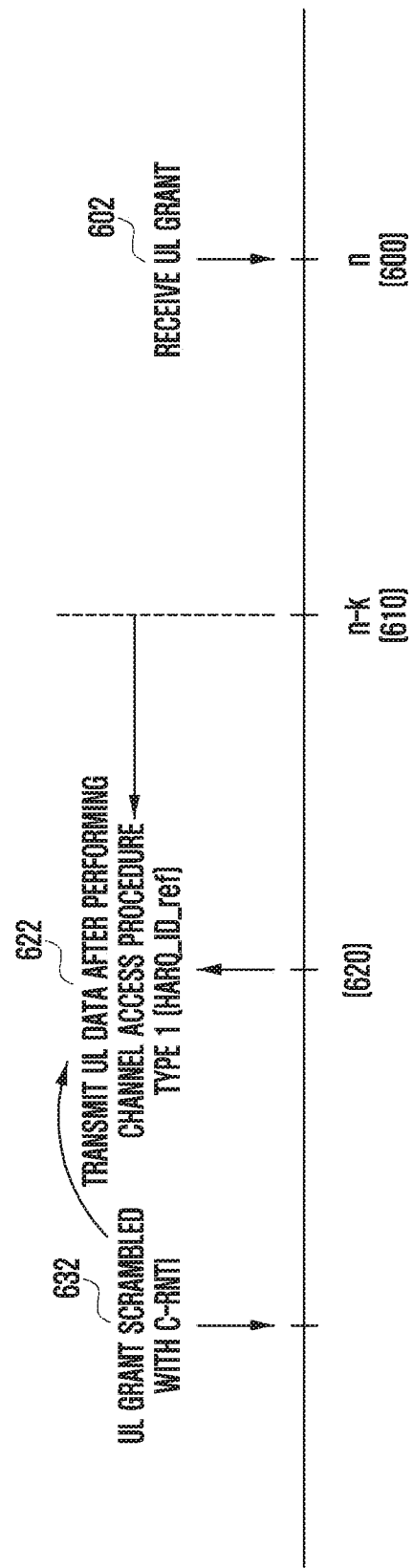
FIG. 6 is a diagram illustrating method 1 of a second embodiment.

Method 1: FIG. 6 is a diagram illustrating method 1 of a second embodiment. The terminal may determine, as a HARQ_ID_ref, a HARQ process ID for uplink data 622 transmitted in a subframe or slot 620 in which the latest uplink data transmission is performed among subframes or slots in which the terminal transmits uplink data after receiving a UL grant 632 scrambled with a C-RNTI from the base station and performing channel access procedure type 1, based on the point in time (n) 600 at which a UL grant 602 is received or based on the point in time (n-k) 610 which is k (k≥1) symbols, k subframes, or k slots earlier from the point in time at which the UL grant is received (FIG. 6 illustrates the above-mentioned case but the disclosure is not limited thereto). If a new data indicator (NDI) for the HARQ_ID_ref is toggled in the UL grant 602, the terminal may initialize a contention window for each channel access priority class (p). If the new data indicator (NDI) for the HARQ_ID_ref is not toggled in the UL grant 602 or data associated with a HARQ process ID which is different from the HARQ_ID_ref is scheduled in the UL grant 602, the terminal may increase a contention window for each channel access priority class (p) to a value subsequently larger than the current value among $CW_p$ values of Table 3.

Another method is as follows.

Figure 7:
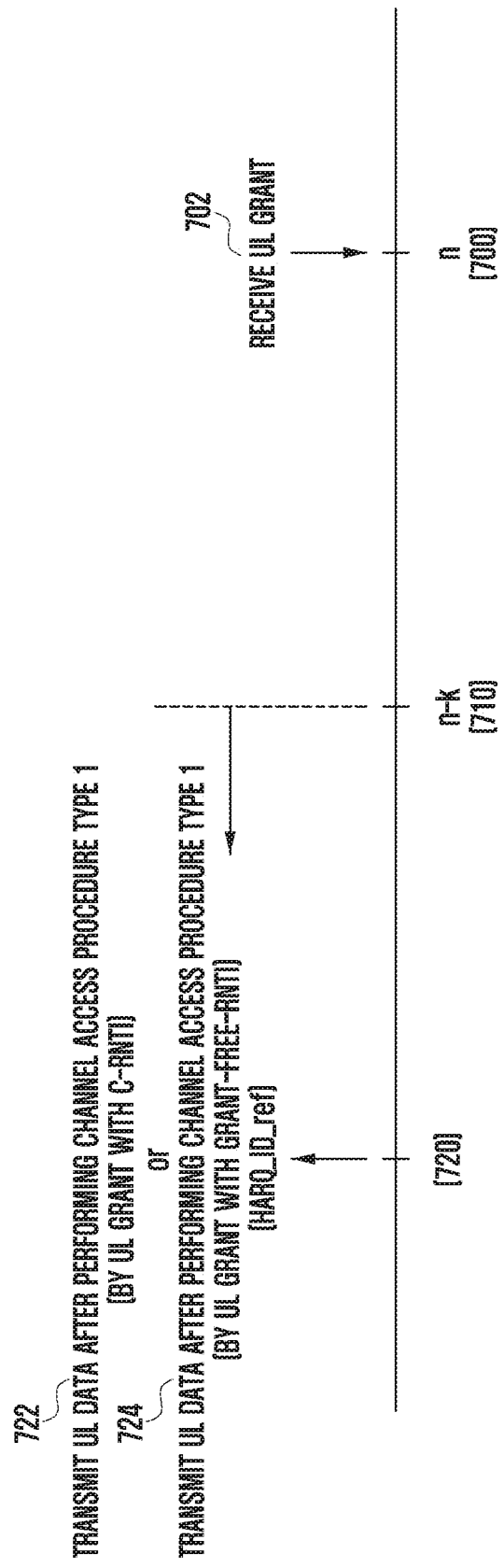
FIG. 7 is a diagram illustrating method 2 of the second embodiment.

Method 2: FIG. 7 is a diagram illustrating method 2 of the second embodiment. The terminal may determine, as a HARQ_ID_ref, a HARQ process ID associated with uplink data transmitted in a subframe or slot 720 in which the latest uplink data transmission is performed, among a subframe or slot in which uplink data transmission 722 is performed after the terminal receives a UL grant scrambled with a C-RNTI from the base station and performs channel access procedure type 1, and a subframe or slot in which uplink data transmission 724 is performed after the terminal receives a DCI, which is scrambled with a predetermined RNTI (e.g., a grant-free-RNTI) configured via an upper signal, from the base station, and performs channel access procedure type 1 in the uplink data transmission resource configured via the DCI, based on the point in time (n) 700 at which a UL grant 702 is received or the point in time (n-k) 710 which is k (k≥1) symbols,k subframes, or k slots earlier than the point in time at which the UL grant is received (FIG. 7 illustrates the above-mentioned case, but the disclosure is not limited thereto). If a new data indicator (NDI) for the HARQ_ID_ref is toggled in the UL grant 702, the terminal may initialize a contention window for each channel access priority class (p). If a new data indicator (NDI) for the HARQ_ID_ref is not toggled in the UL grant 702, the terminal may increase a contention window for each channel access priority class (p) to a value which is subsequently larger than the current value among $CW_p$ values of Table 3.

In this instance, if the terminal is aware of a base station's reception result associated with uplink data corresponding to the HARQ_ID_ref determined via method 1 or method 2 based on the point in time (n) at which uplink data is to be transmitted without reception of a UL grant, or the point in time (n-k) which is k (k≥1) symbols, k subframes, or k slots earlier from the point in time at which uplink data is to be transmitted, the terminal may determine a contention window using the base station's reception result associated with the uplink data corresponding to the HARQ_ID_ref. For example, the terminal may receive the base station's reception result associated with the uplink data corresponding to the HARQ_ID_ref, via a DCI (e.g., a group-common DCI) which is scrambled with a group RNTI, configured for terminals in a predetermined group by the base station via an upper signal. If it is determined (ACK), based on the DCI, that the base station correctly receives the uplink data transmitted at the HARQ_ID_ref, the terminal may initialize the contention window. If it is determined (NACK), based on the DCI, that the base station does not correctly receive the uplink data corresponding to the HARQ_ID_ref, the terminal may increase a contention window for each channel access priority class (p) to a value subsequently larger than the current value among $CW_p$ values of Table 3. If it is determined (DTX), based on the DCI, that although the uplink data corresponding to the HARQ_ID_ref is transmitted, the base station fails to receive the uplink data transmitted at the HARQ_ID_ref, the terminal may maintain the current value of a contention window for each channel access priority class (p) or may increase the current value to a value subsequently larger than the current value among $CW_p$ values of Table 3.

As another example, the terminal may determine, using a timer, a base station's reception result associated with the uplink data transmission corresponding to the HARQ_ID_ref. Particularly, in the case in which the terminal transmits uplink data without a UL grant, the terminal transmits uplink data and triggers or turns on a timer. In this instance, the timer is a timer for maintaining or changing a contention window size used when the terminal performs a channel access procedure, or a timer indicating a time at which the base station needs to transmit a reception result associated with the received uplink data or a time at which a base station's reception result associated with the uplink data transmission is expected to be received by the terminal. The terminal may estimate or determine the base station's reception result associated with the uplink data transmission corresponding to the HARQ_ID_ref, based on the timer.

In this instance, the value of the timer may be defined in advanced between the base station and the terminal, or may be configured by the base station. In this instance, the timer may have a value expressed in units of subframes or slots. Also, the terminal may use a plurality of timers. For example, the terminal may use a timer defined or configured for each HARQ process ID associated with uplink data transmission. In this instance, the terminal may use a single timer. Also, the terminal may trigger, turn on, or operate the timer immediately after transmitting uplink data, or may trigger, turn on, or operate the timer k subframes or slots after the transmission of the uplink data, so that a processing time required when the base station receives and decodes the uplink data is not included in the timer. In this instance, k may be defined in advance between the base station and the terminal, or may be configured by the base station via an upper signal, or may be configured via DCI information.

If the terminal does not receive a reception result associated with the uplink data from the base station until the timer expires, the terminal determines that the base station does not correctly receive the uplink data, and may maintain the current value of a contention window for each channel access priority class (p) or may increase the current value to a value subsequently larger than the current value among $CW_p$ values of Table 3.

Based on the point in time at which uplink data is transmitted, or based on the point in time which is k (k≥1) symbols, k subframes, or k slots earlier than the point in time at which the uplink data is transmitted, the terminal, which transmits uplink data via the previously configured uplink transmission resource without reception of a UL grant from the base station, may determine a contention window value for performing channel access procedure type 1, according to the following method.

Figure 8:
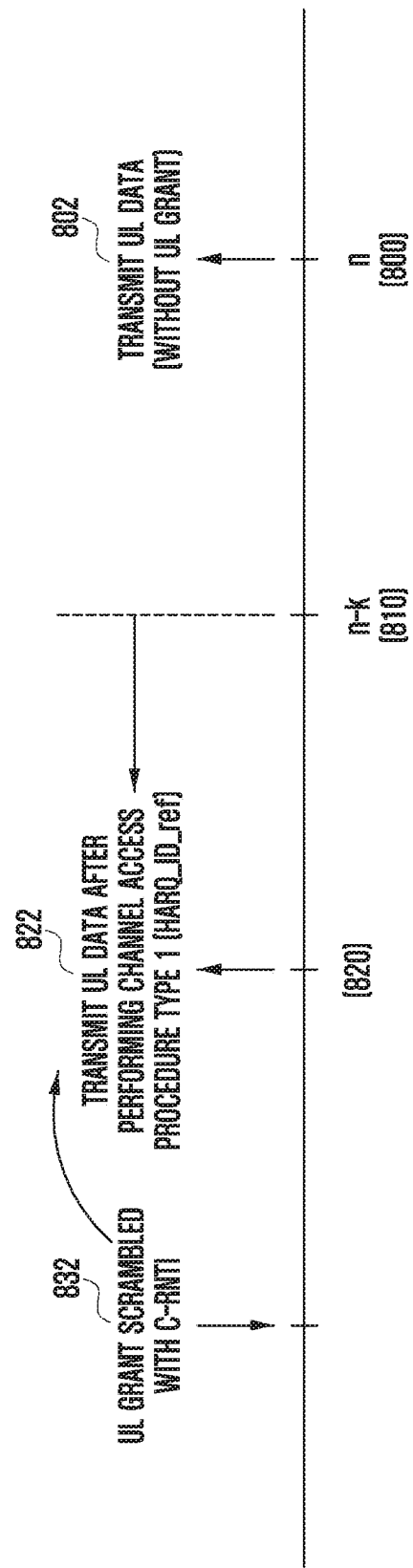
FIG. 8 is a diagram illustrating method 3 of the second embodiment.

Method 3: FIG. 8 is a diagram illustrating method 3 of the second embodiment. The terminal determines, as a HARQ_ID_ref, a HARQ process ID associated with uplink data 822 transmitted in a subframe or slot 820 in which the latest uplink data transmission is performed among subframes or slots in which the terminal transmits uplink data after receiving a UL grant 832 scrambled with a C-RNTI from the base station and performing channel access procedure type 1, based on the point in time (n) 800 at which uplink data transmission 802 is to be performed without reception of a UL grant or based on the point in time (n-k) 810 which is k (k≥1) symbols, k subframes, or k slots earlier than the point in time at which the uplink data is transmitted (FIG. 8 illustrates the above-mentioned case but the disclosure is not limited thereto). If the uplink data transmission 802 is a new transmission associated with the HARQ_ID_ref, the terminal may initialize a contention window for each channel access priority class (p). If the uplink data transmission 802 is a retransmission associated with the HARQ_ID_ref, the terminal may increase a contention window for each channel access priority class (p) to a value which is subsequently larger than the current value among $CW_p$ values of Table 3.

Another method is as follows.

Figure 9:
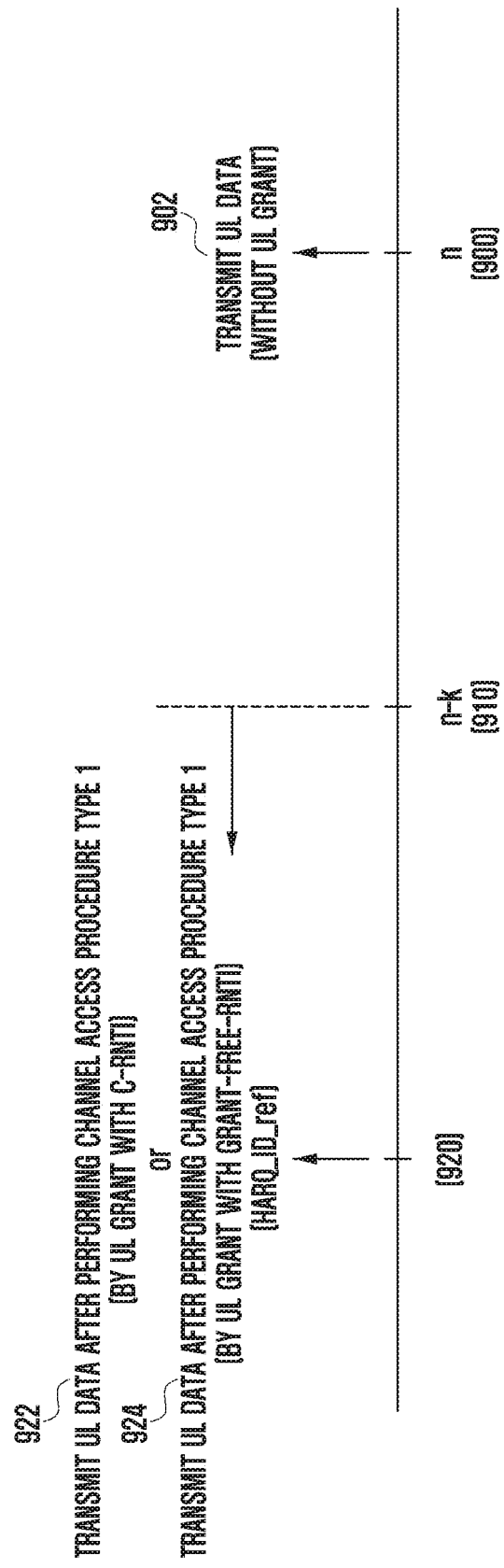
FIG. 9 is a diagram illustrating method 4 of the second embodiment.

Method 4: FIG. 9 is a diagram illustrating method 4 of the second embodiment. Based on the point in time (n) 900 at which uplink data transmission 902 is to be performed without reception of a UL grant or based on the point in time (n-k) 910 which is k (k≥1) symbols, k subframes, or k slots earlier than the point in time at which the uplink data is transmitted (FIG. 9 illustrates the case, but the disclosure is not limited thereto), the terminal may determine, as a HARQ_ID_ref, a HARQ process ID associated with uplink data transmitted in a subframe or slot 920 in which the latest uplink data transmission is performed, among a subframe or slot in which the terminal performs uplink data transmission 922 after receiving a UL grant scrambled with a C-RNTI from the base station and performing channel access procedure type 1, and a subframe or slot in which the terminal performs uplink data transmission 924 after receiving a DCI scrambled with a predetermined RNTI (e.g., a grant-free-RNTI) from the base station and performing channel access procedure type 1 in the uplink data transmission resource configured via the DCI. If the uplink data transmission 902 is an initial transmission associated with the HARQ_ID_ref, the terminal may initialize a contention window for each channel access priority class (p). If the uplink data transmission 902 is a retransmission associated with the HARQ_ID_ref, the terminal may increase a contention window for each channel access priority class (p) to a value which is subsequently larger than the current value among $CW_p$ values of Table 3.

In this instance, if the terminal is aware of a base station's reception result associated with uplink data corresponding to the HARQ_ID_ref determined via method 3 or method 4 based on the point in time (n) at which uplink data is to be transmitted without reception of a UL grant, or the point in time (n-k) which is k (k≥1) symbols, k subframes, or k slots earlier than the point in time at which uplink data is transmitted, the terminal may determine a contention window using the base station's reception result associated with the uplink data corresponding to the HARQ_ID_ref. For example, the terminal may receive the base station's reception result associated with the uplink data corresponding to the HARQ_ID_ref, via a DCI (e.g., a group-common DCI) which is scrambled with a group RNTI configured for terminals in a predetermined group by the base station via an upper signal. If it is determined (ACK), based on the DCI, that the base station correctly receives the uplink data corresponding to the HARQ_ID_ref, the terminal may initialize the contention window. If it is determined (NACK), based on the DCI, that the base station does not correctly receive the uplink data corresponding to the HARQ_ID_ref, the terminal may increase a contention window for each channel access priority class (p) to a value subsequently larger than the current value among $CW_p$ values of Table 3. If it is determined (DTX), based on the DCI, that although the uplink data corresponding to the HARQ_ID_ref is transmitted, the base station fails to receive the uplink data corresponding to the HARQ_ID_ref, the terminal may maintain the current value of a contention window for each channel access priority class (p), or may increase the current value to a value subsequently larger than the current value among $CW_p$ values of Table 3.

As another example, based on the point in time (n) at which the terminal desires to transmit uplink data, or based on the point in time (n-k) which is k symbols, k subframes, or k slots earlier than the point in time at which the uplink data transmission is to be transmitted (hereinafter, a reference point for determining a contention window), the terminal may determine, as a HARQ_ID_ref, a HARQ process ID associated with uplink data transmitted in a subframe or slot in which the latest uplink data transmission is performed among subframes or slots in which the terminal transmits uplink data after performing channel access procedure type 1. The terminal may change the contention window for each channel access priority class (p) to an initial value, may maintain the current value, or may increase the current value to a value which is subsequently larger than the current value among $CW_p$ values of Table 3, using the base station's reception result associated with the uplink data transmission corresponding to the HARQ_ID_ref.

In this instance, the method of determining a base station's reception result associated with the transmission of uplink data corresponding to the HARQ_ID_ref is as follows. The terminal may determine a base station's reception result associated with the uplink data transmission corresponding to the HARQ_ID_ref using new data indicator (NDI) information associated with the HARQ_ID_ref of a UL grant received at the reference point for determining a contention window or a previous point in time. Alternatively, the terminal may determine a base station's reception result associated with the uplink data transmission corresponding to the HARQ_ID_ref using a DCI (e.g., a group-common DCI) scrambled with a group RNTI configured for terminals in a predetermined group via an upper signal. Alternatively, the terminal may determine a base station's reception result associated with the uplink data transmission corresponding to the HARQ_ID_ref using a timer associated with the uplink data transmission or whether the timer associated with the uplink data transmission of the HARQ_ID_ref expires.

If new data indicator (NDI) information associated with the HARQ_ID_ref is toggled in the received UL grant, or if at least one of base station's reception results associated with uplink data transmission of the HARQ_ID_ref is determined to be ACK, based on the received group-common DCI, the terminal may change a contention window for each channel access priority class (p) to an initial value. In this instance, the rate of NACKs to the base station's reception results associated with uplink data transmission of the HARQ_ID_ref is compared with a threshold value (Z) which is defined in advance or configured by the base station via an upper signal. If the rate of NACKs to the base station's reception results associated with the uplink data transmission of the HARQ_ID_ref is less than Z, the terminal may change the contention window for each channel access priority class (p) to an initial value. In this instance, the fact that Z=100 is the same as the case in which the terminal changes the contention window for each channel access priority class (p) to the initial value when at least one ACK exists among the base station's reception results associated with the uplink data transmission of the HARQ_ID_ref.

If the new data indicator (NDI) information for the HARQ_ID_ref in the received UL grant is not toggled, or if all of the base station's reception results associated with the uplink data transmission of the HARQ_ID_ref are identified as not corresponding to an ACK or are identified as corresponding to a NACK, based on the received group common DCI, or if the timer associated with the uplink data transmission expires or all timers associated with the uplink data transmission of the HARQ_ID_ref expire, the terminal may increase the contention window for each channel access priority class (p) to a value which is subsequently larger than the current value among $CW_p$ values of Table 3. In this instance, the rate of NACKs to the base station's reception results associated with uplink data transmission of the HARQ_ID_ref is compared with a threshold value (Z) which is defined in advance or configured by the base station via an upper signal. If the rate of NACKs to the base station's reception results associated with the uplink data transmission of the HARQ_ID_ref is greater than or equal to Z, the terminal may change the contention window for each channel access priority class (p) to a value which is subsequently larger than the current value among $CW_p$ values of Table 3.

In this instance, if a base station's reception result associated with the uplink data transmission of the HARQ_ID_ref is determined to be a NACK/DTX, or a DTX, or any state, based on the received group-common DCI, the terminal may determine that the base station's reception result associated with the uplink data transmission of the HARQ_ID_ref is NACK. If the base station's reception result associated with the uplink data transmission of the HARQ_ID_ref is determined to be a DTX or "no transmission", based on the received group-common DCI, the terminal may disregard the base station's reception result associated with the uplink data transmission of the HARQ_ID_ref, and may maintain the current value of a contention window for each channel access priority class (p).

In this instance, the UL grant may include a DCI scrambled with a C-RNTI of a terminal, or a DCI scrambled with a grant-free-RNTI or a grant-free-SPS-RNTI. In this instance, the DCI scrambled with the grant-free-RNTI or grant-free-SPS-RNTI may exclude a DCI that a base station transmits for activation or release of uplink data transmission without the UL grant.

As another example, the terminal may determine, using a timer, a base station's reception result associated with uplink data transmission transmitted at the HARQ_ID_ref. Particularly, in the case in which the terminal transmits uplink data without a UL grant, the terminal transmits the uplink data and triggers or turns on a timer. In this instance, the timer is a timer for maintaining or changing a contention window size used when the terminal performs a channel access procedure, or a timer indicating a time at which the base station needs to transmit a reception result associated with the received uplink data or a time at which a base station's reception result associated with the uplink data transmission is expected to be received by the terminal. The terminal may estimate or determine the base station's reception result associated with the uplink data transmission corresponding to the HARQ_ID_ref, based on the timer.

In this instance, the value of the timer may be defined in advanced between the base station and the terminal, or may be configured by the base station. In this instance, the timer may have a value expressed in units of subframes or slots. In this instance, the terminal may use a plurality of timers. For example, the terminal may use a timer defined or configured for each HARQ process ID associated with uplink data transmission. In this instance, the terminal may use a single timer. Also, the terminal may trigger, turn on, or operate the timer immediately after transmitting uplink data, or may trigger, turn on, or operate the timer k subframes or slots after the transmission of the uplink data, so that a processing time required when the base station receives and decodes the uplink data is not included in the timer. In this instance, k may be defined in advance between the base station and the terminal, may be configured by the base station via an upper signal, or may be configured via DCI information.

If the terminal does not receive a reception result associated with the uplink data from the base station until the timer expires, the terminal determines that the base station does not correctly receive the uplink data, and may increase the current value for each channel access priority class (p) to a value subsequently larger than the current value among $CW_p$ values of Table 3.

Third Embodiment

In the case in which a terminal receives an uplink transmission configuration or uplink scheduling information (hereinafter, a UL grant) transmitted from a base station via a downlink control channel, and the terminal proceeds with channel access procedure type 1 according to a channel access priority class p in order to transmit an uplink signal in an unlicensed band according to the UL grant, the terminal may maintain or change a contention window ($CW_p$) according to Table 4 below.

TABLE 4

| Channel Access Priority Class (p) | $m_p$ | $CW_{min, p}$ | $CW_{max, p}$ | $T_{ulmcot, p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

In this instance, if it is configured that other devices do not exist in the unlicensed band (absenceOfAnyOtherTechnology-r14=TRUE), for p=3, 4 via an upper signal, $T_{ulmcot,p}$ may be 10 ms. Also, if $T_{ulmcot,p}$ is 6 ms, $T_{ulmcot,p}$ may be increased to 8 ms by adding one or more gaps, the size of each being a minimum of 100 us. In this instance, the length of the maximum occupancy time is 6 ms before the gap is added.

If the terminal receives an uplink transmission configuration or uplink scheduling information (hereinafter, a UL grant), which is scrambled with a terminal's unique identifier (C-RNTI) and is transmitted from the base station via a downlink control channel, and at least one of HARQ process IDs indicated by the received UL grant is a HARQ_ID_ref, and a new data indicator (NDI) for the HARQ_ID_ref is toggled (toggling), the terminal may initialize a contention window for each channel access priority class. In other words, $CW_p=CW_{min,p}$, p=1, 2, 3, 4. In this instance, p indicates a channel access priority class, and the terminal may receive a p value, which is indicated by the base station via the UL grant, or is configured via an upper signal. In this instance, the terminal may determine p depending on the uplink data type of uplink data to be transmitted.

If at least one of the HARQ process IDs indicated by the received UL grant is a HARQ_ID_ref, and a new data indicator (NDI) for the HARQ_ID_ref is not toggled, or if the NDI is set to a value indicating retransmission, the terminal may increase the current contention window to a contention window which is subsequently larger than the current contention window value. In this instance, a HARQ process ID associated with uplink data transmitted in a subframe or slot ($n_w$) in which the terminal transmits uplink data after performing the latest channel access procedure type 1, among subframes or slots in which the terminal transmits uplink data, based on a subframe or slot ($n_g$-k) which exists K subframes or slots earlier from the subframe or slot ($n_g$) in which the terminal receives the UL grant, is the HARQ_ID_ref. In this instance, in the case in which the terminal continuously transmits uplink data in a plurality of subframes or slots (i.e., transmits uplink data in $n_0$, $n_1$, ... $n_{w-1}$, and $n_w$) including the subframe or slot ($n_w$) in which the terminal transmits uplink data after performing the latest channel access procedure type 1, if an uplink signal is transmitted in all symbols included in the duration where the uplink data is transmitted, a HARQ process ID associated with uplink data transmitted in the first subframe or slot ($n_0$) of the uplink transmission interval is the HARQ_ID_ref.

In this instance, the terminal that receives an indication to perform the channel access procedure type 1 via the UL grant may determine a contention window value to be used for performing the channel access procedure type 1 based on the point in time at which the UL grant is received, and the determined contention window value may be maintained for the uplink data channel transmission configured by the UL grant, without a change. In other words, although the terminal determines a contention window value ($CW_{p1}$) at the point in time at which UL grant 1 is received, if the terminal receives another UL grant 2 before transmitting uplink data (PUSCH 1) configured by the UL grant 1 after the point in time at which the UL grant 1 is received, the terminal may determine a contention window value ($CW_{p2}$) to be used for performing the channel access procedure type 1 based on the point in time at which the UL grant 2 is newly received. In this instance, the contention window ($CW_{p2}$) may be maintained or changed by the terminal based on the previous contention window value ($CW_{p1}$), but $CW_{p1}$ is independent from the UL grant 2. In other words, a contention window value for a channel access procedure for transmitting uplink data (PUSCH 1) configured by the UL grant 1 is $CW_{p1}$.

If uplink data, or a codeword or TB, which is transmitted by the terminal via an uplink data channel is divided into CBGs (hereinafter, being interchangeably used with code block groups), and the base station transmits or reports, to the terminal, a reception result associated with each CBG as a reception result associated with the uplink data, the terminal may determine the reception result associated with the uplink data using at least one of method 1 or method 2 of the first embodiment. For example, the terminal may transmit a CBG, which the base station configures or requests via a UL grant that the terminal receives from the base station. If the terminal is configured, by the base station, to divide uplink data, or a codeword or TB into M code block groups, and to transmit the same via an uplink data channel, the base station may transmit a UL grant for configuring initial uplink data transmission to the terminal so as to schedule uplink data transmission.

In this instance, a transmission indicator for the M code block groups may be included in the UL grant. For example, the base station may indicate transmission of the M code block groups for the initial transmission, and the transmission indicator may be configured based on toggling. If the transmission indicator is configured based on toggling, the transmission indicator for the initial transmission may be one of 0 or 1. In this instance, the transmission indicator may directly indicate initial transmission or retransmission of the M code block groups. For example, 0 indicates initial transmission, and 1 indicates retransmission.

For example, the base station may set transmission indicator values for the M code block groups to 0 via a UL grant, so that the terminal performs initial transmission of all code block groups. The base station that receives the configured uplink data transmission may transmit or report a reception result to the terminal via a UL grant. In this instance, the base station may set (toggling) a transmission indicator value to 1 as a reception result (ACK) associated with a code block group that is correctly received among the reception results associated with the M code block groups, and may set a transmission indicator value to 0 as a reception result (NACK) associated with a code block group that is not correctly received, so as to configure the terminal to retransmit a few code block groups. If the base station, which receives the retransmitted uplink data, correctly receives all of the retransmitted code block groups, the base station sets (toggling), to 1, all of the transmission indicator values of a UL grant that configures the terminal to transmit new uplink data, so as to inform the terminal that the base station correctly receives the previously transmitted uplink data, and at the same time, to configure new uplink data transmission for the terminal. Therefore, the terminal determines a base station's reception result associated with uplink data corresponding to the HARQ_ID-REF, and may determine whether to change a contention window.

In other words, the terminal compares transmission indicator values of the received UL grant with transmission indicator values of the UL grant that configures initial uplink data transmission which was previously transmitted, and may initialize a contention window if all of the M transmission indicator values are toggled. The terminal compares the transmission indicator values of the received UL grant with transmission indicator values of the UL grant that configures initial uplink data transmission which was previously transmitted, and if $Z_{TB}$ of the M transmission indicator values (e.g., $Z_{TB}$=100% or $Z_{TB}$=the number of code block groups corresponding to a NACK/M) are not toggled, the terminal may increase a contention window for each channel access priority class (p) to a value which is subsequently larger than the current value among $CW_p$ values of Table 4. In this instance, the method of maintaining or changing a contention window based on code block group-based uplink data information reception results of the base station, may comply with at least one of method 1 or method 2 of the first embodiment.

An uplink transmission scheme (hereinafter, a grant-free transmission scheme or a semi-persistent scheduling (SPS) transmission scheme) that is capable of performing uplink data transmission without a UL grant may be configured for the terminal via an upper signal, in addition to the scheme in which the terminal receives a UL grant scrambled with a C-RNTI from the base station and performs uplink data after performing channel access procedure type 1. In this instance, via the upper signal, resource information associated with a resource in which uplink data transmission according to the grant-free transmission scheme is allowed, for example, information associated with a time resource (a slot, symbol, or subframe) in which uplink data transmission is allowed without reception of a UL grant, may be configured for the terminal in the form of period information, period and interval information, or bitmap information associated with a predetermined interval or time. The upper signal may include RNTI information (e.g., a grant-free-RNTI or grant free-SPS-RNTI) to be used for a PDCCH or the like associated with the uplink transmission scheme.

In this instance, the terminal may receive a DCI, which is scrambled with an RNTI (e.g., a grant-free-RNTI) configured via the upper signal, from the base station, and may activate, deactivate, or release the configured grant-free transmission scheme according to one or a plurality of field values included in the DCI. For example, the DCI may include a field indicating whether the DCI is for activating, deactivating, or releasing the configured grant-free transmission scheme. The terminal may activate, deactivate, or release the grant-free transmission scheme based on the information in the field.

As another example, using the value defined in advance for the one or the plurality of fields of the DCI, the terminal may determine whether the DCI is for activating, deactivating or releasing the grant-free transmission scheme. For example, if the values of a TPC command field and a cyclic shift demodulation reference signal (DM-RS) field included in the DCI are set to 0, and an MSB value of a field indicating an MCS is 0, the terminal may determine that the grant-free transmission scheme is activated. Similarly, if the values of the TPC command field and the cyclic shift DM-RS field included in the DCI are set to 0, and the value of a field indicating an MCS and the value of frequency resource allocation information are set to 1, the terminal may determine that the grant-free transmission scheme is deactivated or released. In this instance, determining whether the DCI is for activating, deactivating, or releasing the grant-free transmission scheme, by using the values of the TPC, DMRS, and MCS fields and the like or information included in the DCI, is merely an example.

In the case of determining whether to activate, deactivate, or release the configured grant-free transmission scheme by using the DCI, the terminal needs to determine a DCI format to be used by the base station for indicating activation, deactivation, or releasing of the configured grant-free transmission scheme.

Method 3-1: indicates activation, deactivation, or releasing of a configured grant-free transmission scheme using a single or a plurality of DCI formats defined in advance.

Method 3-1 determines a DCI format, which is to be used for indicating activation, deactivation, or releasing of the configured grant-free transmission scheme, according to a rule defined or agreed upon between a base station and a terminal in advance. A description will be provided with reference to an uplink grant-free transmission scheme. A terminal for which the grant-free transmission scheme or SPS transmission scheme is configured, may determine one of the DCI formats (or UL grants) which may be used for configuring uplink data transmission (e.g., a DCI format having the smallest size or a DCI format having the largest size among the DCI formats (or UL grants) which may be used for configuring uplink data transmission) to be a DCI format to be used for indicating the activation, deactivation, or releasing of the configured grant-free transmission scheme.

For example, in the case of LTE, one of the DCI format 0, 0A, and 0B may be defined in advance as a DCI format to be used for indicating activation, deactivation, or releasing of the configured grant-free transmission scheme. In this instance, in the case of a terminal for which uplink data transmission of two TBs is configured, one of the DCI formats (e.g., DCI formats 4, 4A, and 4B) which may be used for configuring uplink data transmission associated with the two TBs may be defined in advance to be a DCI format to be used for indicating activation, deactivation, or releasing of the configured grant-free transmission scheme.

Method 3-2: configures a DCI format to be used for indicating activation, deactivation, or releasing of a configured grant-free transmission scheme, via an upper signal.

Method 3-2 is a method in which a DCI format used for indicating activation, deactivation, or releasing of the configured grant-free transmission scheme is configured for a terminal by a base station via an upper signal. For example, information associated with a DCI format used for indicating activation, deactivation, or releasing of the configured grant-free transmission scheme may be included in an RRC configuration that configures the grant-free transmission scheme. In this instance, each DCI formation may be independently configured for indicating activation, deactivation, or releasing of the configured grant-free transmission scheme, and a single DCI format may be used to indicate activation, deactivation, or releasing of the configured grant-free transmission scheme.

If the information associated with a DCI format used for indicating activation, deactivation, or releasing of the configured grant-free transmission scheme is not included in the upper signal information, the terminal may determine that a DCI format (or UL grant), which a base station uses for configuring uplink data transmission, is to be used for indicating activation, deactivation, or releasing of the configured grant-free transmission scheme. If a plurality of DCI formats is used by the base station to configure uplink data transmission, the terminal may determine that a DCI format used for indicating fallback transmission or a DCI format having the shortest length among the plurality of DCI formats is to be used for indicating activation, deactivation, or releasing of the configured grant-free transmission scheme. In this instance, the terminal may determine that a DCI format used for configuring uplink data transmission for a transmission mode configured for the terminal or a DCI format other than a DCI format used for indicating uplink fallback transmission among the plurality of DCI formats is to be used for indicating activation, deactivation, or releasing of the configured grant-free transmission scheme.

Method 3-3: determines a DCI format used for indicating activation, deactivation, or releasing of a configured grant-free transmission scheme among DCI formats, which are configured to be monitored by a terminal.

Method 3-3 is a method of determining a DCI format used for indicating activation, deactivation, or releasing of the configured grant-free transmission scheme, among DCI formats (or UL grants) which are configured, by the base station, to be monitored, among DCI formats (or UL grants) which may be used for configuring uplink data transmission for the terminal. A description will be provided with reference to an LTE terminal that performs uplink transmission in an unlicensed band. Uplink data transmission may be configured for the terminal by the base station via a plurality of DCI formats (or UL grants). For example, uplink data transmission may be configured for the terminal via DCI formats 0A, 0B, 4A, and 4B. In this instance, DCI format 0A is a DCI format that configures uplink data channel transmission for a single TB in a single subframe. DCI format 0B is a DCI format that configures uplink data channel transmission for a single TB in one or more subframes. DCI format 4A is a DCI format that configures uplink data channel transmission for two TBs in a single subframe. DCI format 4B is a DCI format that configures uplink data channel transmission for two or more TBs in one or more subframes.

In this instance, the terminal may be configured to monitor or not to monitor one or more DCI formats among DCI formats 0A, 0B, 4A, and 4B. For example, the terminal may be configured not to monitor DCI formats 0A and 4A via an upper signal (e.g., skipMonitoringDCI-Format0A-r14 or skipMonitoringDCI-Format4A-r14), and the configuration may be independent from DCI format 0A and 4A. As another example, the terminal may be configured to monitor DCI format 0B and 4B via an upper signal (e.g., maxNumberOfSchedSubframes-Format0B-r14 or maxNumberOfSchedSubframes-Format4B-r14). Therefore, a DCI format that configures uplink data channel transmission may be independent for each terminal, according to configuration by the base station. For example, a terminal that monitors DCI format 0A, a terminal that monitors DCI format 0A/0B, a terminal that monitors DCI format 0A/4A, a terminal that monitors DCI format 4A/4B, a terminal that monitors DCI format 0B/4B, or a terminal that monitors DCI format 0A/0B/4A/4B may exist together in a system. Therefore, sometimes, it is difficult to apply the method which indicates activation, deactivation, or releasing of a configured grant-free transmission scheme using a DCI format defined in advance according to method 3-1.

Method 3-3 provides a method of determining a DCI format used for indicating activation, deactivation, or releasing of the configured grant-free transmission scheme, among DCI formats (or UL grants), which are configured, by a base station, to be monitored by the terminal, among DCI formats (or UL grants) which may be used for configuring uplink data transmission for the terminal. If the terminal is configured to monitor only one DCI format among DCI formats that configure uplink data transmission, by the base station via an upper signal, or if uplink data transmission is capable of being configured for the terminal by the base station only via a single DCI format (or UL grant), the terminal may determine that the DCI format or UL grant is a DCI format used for indicating activation, deactivation, releasing of the configured grant-free transmission scheme. If the terminal is configured to monitor a plurality of DCI formats among DCI formats that configure uplink data transmission, by the base station via an upper signal, or if uplink data transmission is capable of being configured for the terminal by the base station via a plurality of DCI formats (or UL grants), the terminal may determine that at least one DCI format or UL grant among the DCI formats or UL grants of which monitoring is configured, is a DCI format used for indicating activation, deactivation, releasing of the configured grant-free transmission scheme.

For example, if the terminal is configured to monitor a DCI format used for configuring uplink data transmission in a single subframe or slot, and a DCI format used for configuring uplink data transmission in one or more subframes or slots, the terminal may determine that the DCI format used for configuring uplink data transmission in a single subframe or slot is a DCI format used for indicating activation, deactivation, or releasing of the configured grant-free transmission scheme. In this instance, the terminal determines the DCI format used for configuring uplink data transmission in a single subframe or slot to be a DCI format for indicating activation, deactivation, or releasing of the configured grant-free transmission scheme, by the reason that the DCI format has a size or magnitude smaller than that of the DCI format used for configuring uplink data transmission in one or more subframes or slots, and a code rate is lower and the reception performance of the DCI format is higher. In this instance, however, the terminal may determine the DCI format used for configuring uplink data transmission in one or more subframes or slots to be a DCI format used for indicating activation, deactivation, or releasing of the configured grant-free transmission scheme.

If the terminal is configured to monitor a DCI format used for configuring uplink data transmission for a single TB in a single subframe or slot and a DCI format used for configuring uplink data transmission for two TBs or two or more TBs in a single subframe or slot, the terminal may determine the DCI format used for configuring uplink data transmission for two TBs or two or more TBs in a single subframe or slot to be a DCI format used for indicating activation, deactivation, or releasing of the configured grant-free transmission scheme. In this instance, the terminal determines the DCI format used for configuring uplink data transmission for two TBs or two or more TBs in a single subframe or slot to be a DCI format used for indicating activation, deactivation, or releasing of the configured grant-free transmission scheme, by the reason that the DCI format may provide a higher transmission rate than that of the DCI format used for configuring uplink data transmission for one or more TBs. However, the DCI format used for configuring uplink data transmission for a single TB has a smaller size or magnitude than that of the DCI format used for configuring uplink data transmission for two TBs or two or more TBs, and a code rate is lower and the reception performance of the DCI format is higher. Accordingly, in this instance, the terminal may determine the DCI format used for configuring uplink data transmission for a single TB to be a DCI format used for indicating activation, deactivation, or releasing of the configured grant-free transmission scheme.

If the terminal is configured to monitor at least two DCI formats among a DCI format used for configuring uplink data transmission in a single subframe or slot, a DCI format used for configuring uplink data transmission in one or more subframes or slots, a DCI format used for configuring uplink data transmission for a single TB, and a DCI format used for configuring uplink data transmission for two TBs or two or more TBs in a single subframe or slot, the terminal may determine a DCI format used for indicating activation, deactivation, or releasing of the configured grant-free transmission scheme according to the above-described determination method.

For example, the terminal may perform determination as shown in Table 5. Table 5 relates to the case of determining a DCI format used for indicating activation, deactivation, or releasing of the configured grant-free transmission scheme, by prioritizing a DCI format used for configuring uplink data transmission for two TBs and a DCI format used for configuring uplink data transmission in a single subframe or slot, over the others. Particularly, Table 5 is an example of prioritizing a DCI format for configuring uplink data transmission for two TBs, when the DCI format for configuring uplink data transmission for two TBs and the DCI format used for configuring uplink data transmission in a single subframe or slot are configured together. Table 5 is merely an example, and a DCI format used for indicating activation, deactivation, or releasing of the configured grant-free transmission scheme may be determined according to a different priority order. For example, a DCI format having a large size or magnitude among the configured DCI formats may be determined to be a DCI format used for indicating activation, deactivation, or releasing of the configured grant-free transmission scheme, as shown in Table 6.

TABLE 5

| Enabled/disabled DCI format for Uplink scheduling | | | | DCI for activation | DCI for deactivation/ release |
| --- | --- | --- | --- | --- | --- |
| 0A | 0B | 4A | 4B | | |
| ○ | | | | 0A | 0A |
| | ○ | | | 0B | 0B |
| | | ○ | | 4A | 4A |
| | | | ○ | 4B | 4B |
| ○ | ○ | | | 0A | 0A |
| ○ | | ○ | | 4A | 4A |

TABLE 5-continued

| Enabled/disabled DCI format for Uplink scheduling | | | | DCI for activation | DCI for deactivation/ release |
| --- | --- | --- | --- | --- | --- |
| 0A | 0B | 4A | 4B | | |
| ○ | | | ○ | 4B | 4B |
| | ○ | ○ | | 4A | 4A |
| | ○ | | ○ | 4B | 4B |
| | | ○ | ○ | 4A | 4A |
| ○ | ○ | ○ | | 4A | 4A |
| ○ | ○ | | ○ | 4B | 4B |
| ○ | | ○ | ○ | 4A | 4A |
| | ○ | ○ | ○ | 4A | 4A |
| ○ | ○ | ○ | ○ | 4A | 4A |

TABLE 6

| Enabled/disabled DCI format for Uplink scheduling | | | | DCI for activation | DCI for deactivation/ release |
| --- | --- | --- | --- | --- | --- |
| 0A | 0B | 4A | 4B | | |
| ○ | | | | 0A | 0A |
| | ○ | | | 0B | 0B |
| | | ○ | | 4A | 4A |
| | | | ○ | 4B | 4B |
| ○ | ○ | | | 0B | 0B |
| ○ | | ○ | | 4A | 4A |
| ○ | | | ○ | 4B | 4B |
| | ○ | ○ | | 4A | 4A |
| | ○ | | ○ | 4B | 4B |
| | | ○ | ○ | 4B | 4B |
| ○ | ○ | ○ | | 4A | 4A |
| ○ | ○ | | ○ | 4B | 4B |
| ○ | | ○ | ○ | 4B | 4B |
| | ○ | ○ | ○ | 4B | 4B |
| ○ | ○ | ○ | ○ | 4B | 4B |

Figure 10:
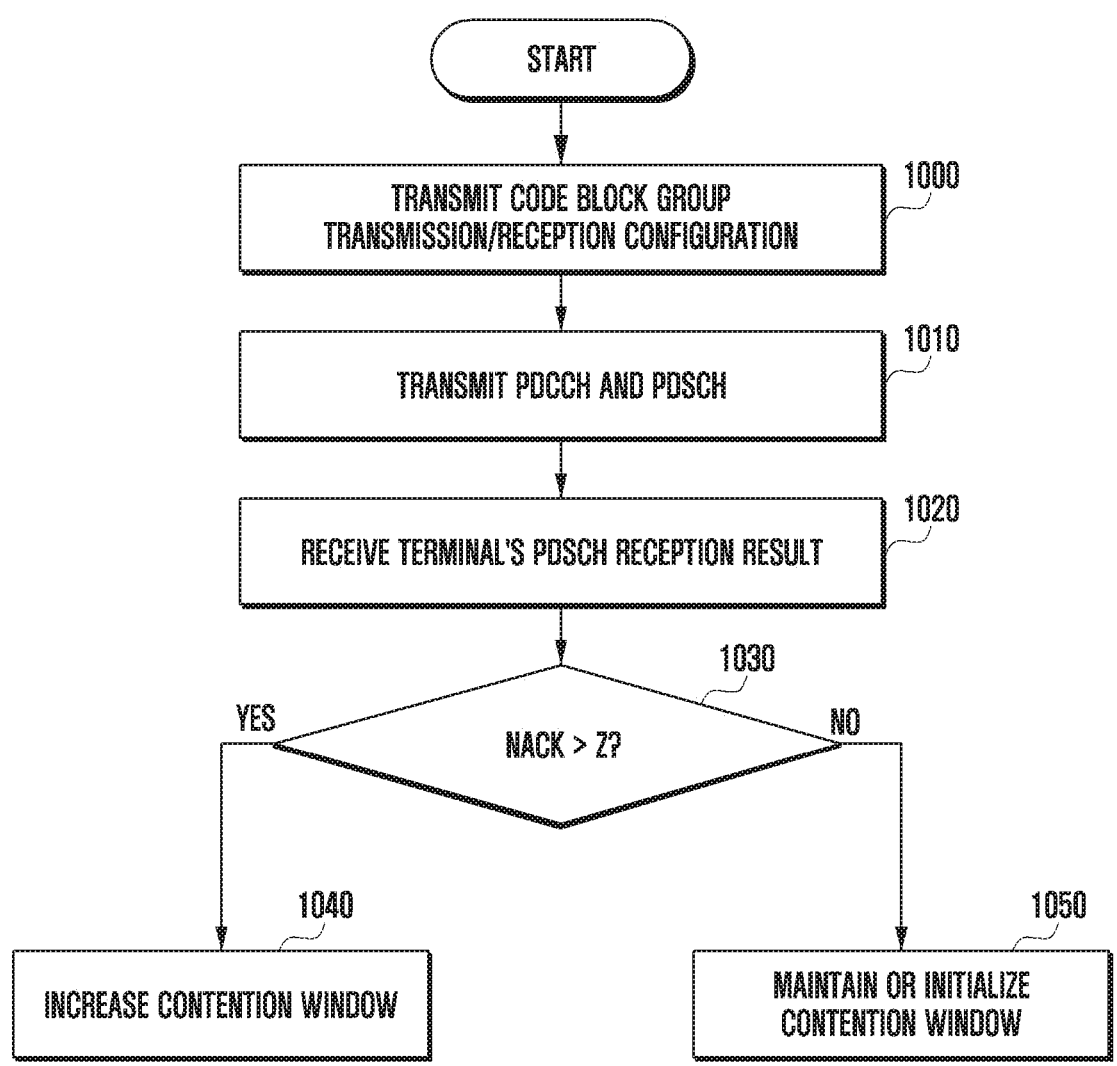
FIG. 10 is a flowchart illustrating operation of a base station according to an embodiment of the disclosure.

FIG. 10 is a diagram illustrating operation of a base station according to the disclosure. Operation of a base station according to the first embodiment will be described with reference to FIG. 10 as follows. In operation 1000, a base station may perform configuration via an upper signal so that downlink data is divided into M code block groups when being transmitted to a terminal, and a terminal's reception result associated with a transmitted code block group is to be reported to the base station. In this instance, M is a positive integer including 1. The base station may perform configuration so that the terminal reports, to the base station, a reception result associated with an actually transmitted code block group among the M code block groups. Alternatively, the base station may perform configuration so that the terminal reports, to the base station, reception results associated with the M configured code block groups including a reception result associated with an actually transmitted code block group.

In operation 1010, the base station transmits a DCI to the terminal via a PDCCH after a channel access procedure, so as to indicate reception of a PDSCH indicated by the DCI. The base station transmits the PDSCH by dividing the downlink data, transmitted to the terminal, into the M code block groups as configured in operation 1000. In this instance, DCI information, which is transmitted via the PDCCH and indicates reception of the PDSCH, may include the field of an indicator (or a CBG index) associated with an actually transmitted code block group among the M code block groups, and the like. Accordingly, information associated with an actually transmitted code block group may be transmitted to the terminal.

In operation 1020, the base station may receive terminal's reception results or a report thereof in association with the M code block groups transmitted via the PDSCH The base station may determine whether at least Z % of the terminal's reception results associated with downlink data in a reference subframe or reference slot which are determined according to at least one method of method 1 or method 2 provided in the disclosure, based on the reception result associated with a downlink data signal transmitted in the reference subframe or slot during the downlink data signal transmission, corresponds to a NACK, in operation 1030. If at least Z % of the reception results corresponds to a NACK, the base station changes a contention window size or value used for performing a channel access procedure with respect to the unlicensed band to a value which is subsequently larger in operation 1040. If it is different from the case in which at least Z % of the terminal's downlink data reception results in the reference subframe or reference slot corresponds to a NACK, the base station maintains a contention window size or value used for performing the channel access procedure with respect to the unlicensed band, or changes the same to an initial value in operation 1050.

Figure 11:
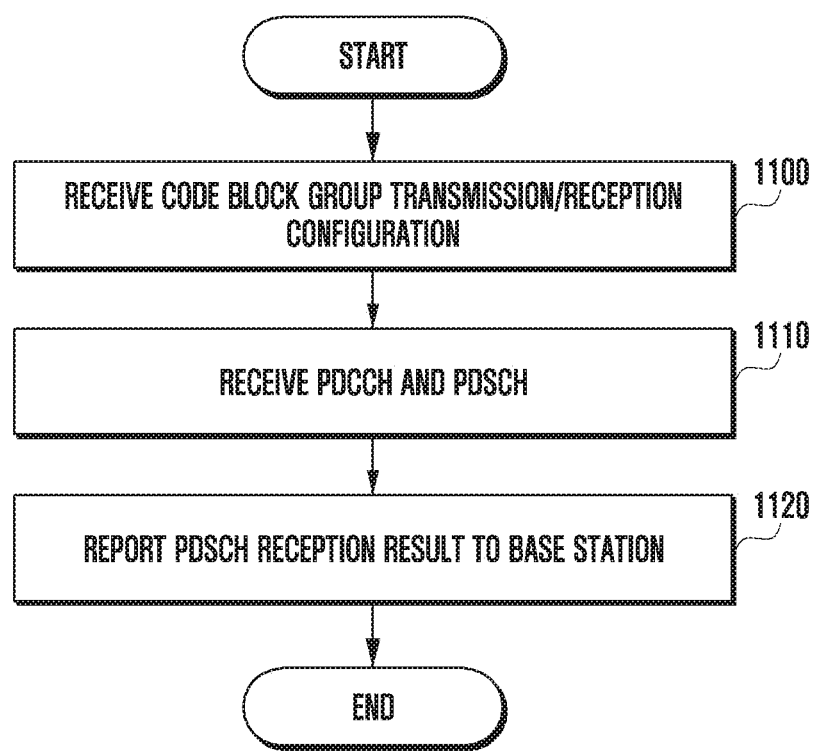
FIG. 11 is a flowchart illustrating operation of a terminal according to an embodiment of the disclosure.

FIG. 11 is a diagram illustrating operation of a terminal according to the disclosure. Operation of a terminal according to the first embodiment will be described with reference to FIG. 11 as follows. In operation 1100, a terminal may be configured by a base station via an upper signal so that downlink data is divided into M code block groups when being transmitted, and a reception result associated with a transmitted code block group is to be reported to the base station. In this instance, M is a positive integer including 1. The terminal may be configured so that the terminal reports, to the base station, a reception result associated with an actually transmitted code block group among the M code block groups. Alternatively, the terminal may be configured so that the terminal reports, to the base station, reception results associated with the M configured code block groups including a reception result associated with an actually transmitted code block group. In operation 1110, the terminal may receive a DCI transmitted from the base station via a PDCCH, and may receive a PDSCH indicated by the DCI. In this instance, the base station transmits a PDSCH by dividing downlink data into M code block groups as configured in operation 1000. In this instance, DCI information, which is transmitted via the PDCCH and indicates reception of the PDSCH, may include the field of an indicator (or a CBG index) associated with an actually transmitted code block group among the M code block groups, and the like. Accordingly, the terminal may receive information associated with an actually transmitted code block group from the base station. In operation 1120, the terminal may report, to the base station, reception results associated with the M code block groups of the downlink data.

Figure 12:
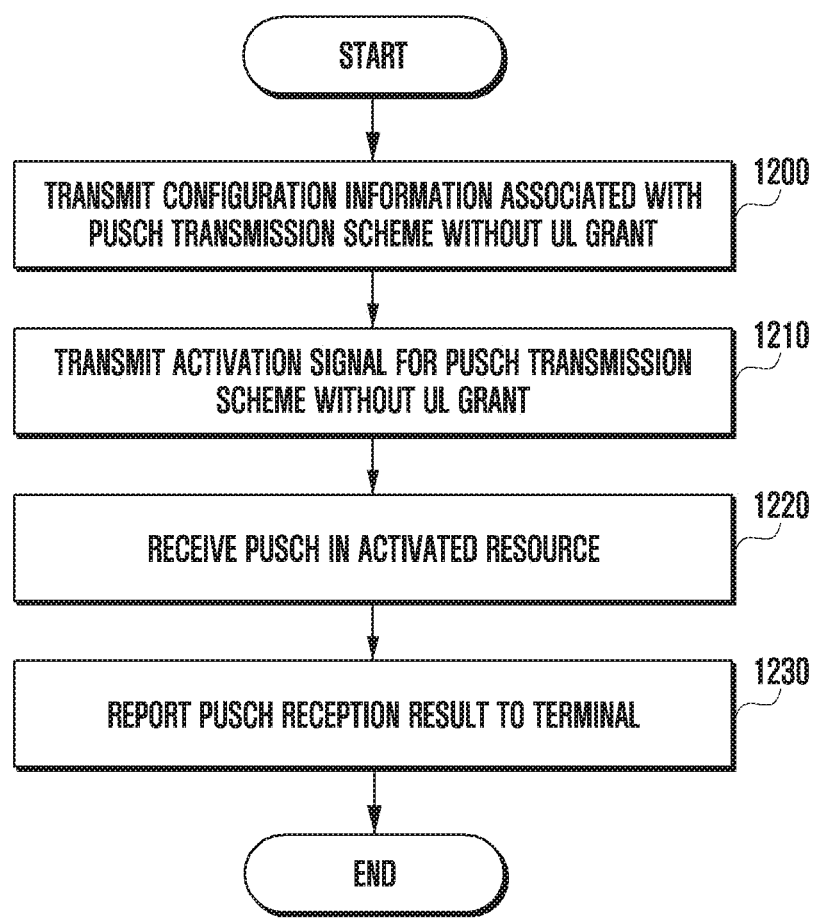
FIG. 12 is a flowchart illustrating another example of operation of a base station according to an embodiment of the disclosure.

FIG. 12 is a diagram illustrating another example of operation of a base station according to the disclosure. Operation of a base station according to the second embodiment will be described with reference to FIG. 12 as follows. In operation 1200, a base station may configure a PUSCH transmission scheme, which is capable of transmitting uplink data without a UL grant, for a terminal via an upper signal. In this instance, the configuration may include configuration information for enabling PUSCH transmission that is capable of transmitting uplink data without a UL grant, for example, period information associated with a transmission resource capable of transmitting uplink data according to the PUSCH transmission scheme, or the like. In operation 1210, the base station may activate (activation) the PUSCH transmission scheme configured via the upper signal, by using DCI transmitted via the PDCCH. In this instance, the DCI is scrambled with a new RNTI (grant-free (GF)-RNTI) and is transmitted. Accordingly, the DCI may be distinct from another UL grant or a UL grant which is scrambled with a C-RNTI and is transmitted. Also, a few fields in the DCI are set to values defined in advance between the base station and the terminal so that the terminal that receives the DCI may determine that the PUSCH transmission scheme is activated. In operation 1220, in the activated resource, the base station receives a PUSCH transmitted by the terminal, according to the PUSCH transmission scheme. In this instance, in association with the activated resource, an uplink resource in which the terminal is capable of performing transmission according to the PUSCH transmission scheme, may be configured using at least one of a period configured via the upper signal in operation 1200, and a time at which the DCI for activation of the transmission scheme is transmitted or time offset information included in the DCI transmitted for activation of the transmission scheme in operation 1210.

In operation 1230, the base station may report, to the terminal, a reception result associated with uplink data received in operation 1220. In this instance, the reception result may be reported to the terminal via a UL grant which is scrambled with a GF-RNTI or a C-RNTI, or may be reported to one or more terminals via a group-common control channel or group-common control information. In this instance, the base station may include a HARQ process ID associated with uplink data transmission or time information corresponding thereto (e.g., indicating that an uplink reception result is a reception result associated with uplink data transmitted a k time earlier based on the time at which the group-common control channel or group-common control information is transmitted) in the group-common control channel or group-common control information in order to inform the terminal of information indicating uplink data transmission which corresponds to the uplink reception result transmitted via the group-common control channel or group-common control information.

Figure 13:
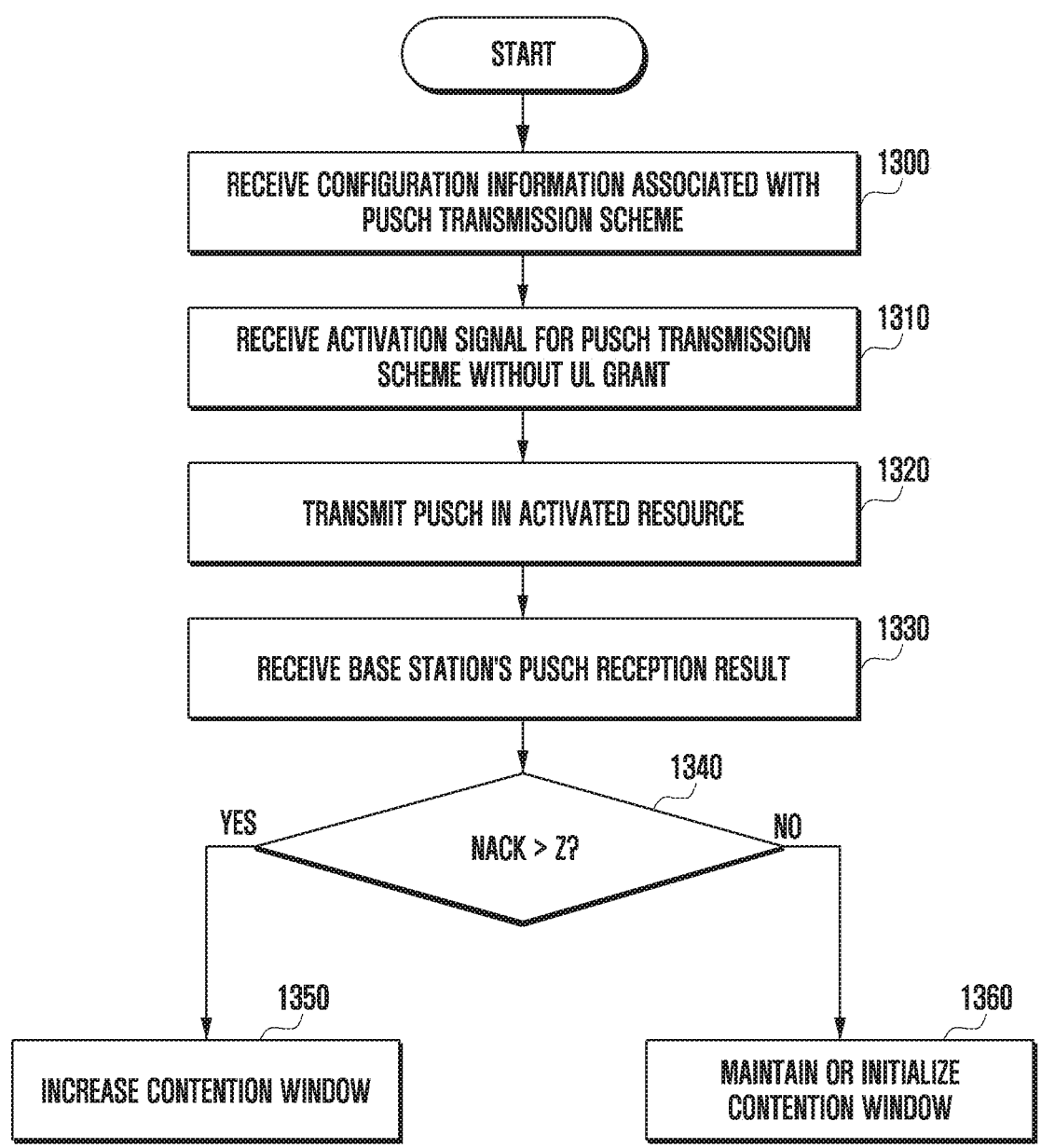
FIG. 13 is a flowchart illustrating another example of operation of a terminal according to an embodiment of the disclosure.

FIG. 13 is a diagram illustrating another example of operation of a terminal according to the disclosure. Operation of a terminal according to the second embodiment will be described with reference to FIG. 13 as follows. In operation 1300, a PUSCH transmission scheme that is capable of transmitting uplink data without a UL grant may be configured for a terminal via an upper signal. In this instance, the configuration may include configuration information for enabling PUSCH transmission that is capable of transmitting uplink data without a UL grant, for example, period information associated with a transmission resource capable of transmitting uplink data according to the PUSCH transmission scheme, or the like. In operation 1310, the terminal may activate (activation) the PUSCH transmission scheme configured via the upper signal and a related uplink resource, by receiving DCI transmitted via the PDCCH. In this instance, the DCI is scrambled with a new RNTI (GF-RNTI) and is transmitted. Accordingly, the DCI may be distinct from another UL grant or a UL grant which is scrambled with a C-RNTI and is transmitted. Also, a few fields in the DCI are set to values defined in advance between the base station and the terminal so that the terminal may determine, based on the DCI, that the configured PUSCH transmission scheme is activated.

In operation 1320, the terminal transmits a PUSCH according to the PUSCH transmission scheme in the activated resource. In operation 1330, the terminal may receive a base station's reception result or a report thereof in association with the uplink data transmitted in operation 1320. In this instance, the reception result may be received from the base station via a UL grant which is scrambled with a GF-RNTI or a C-RNTI, or may be received via a group-common control channel or group-common control information. In this instance, if the terminal receives a reception result from the base station via a UL grant scrambled with a GF-RNTI or a C-RNTI, the terminal may determine a base station's reception result using an NDI value. In the case of a base station's reception result associated with the uplink data via the group-common control channel or group-common control information, the terminal may directly receive a report as an ACK or NACK. In this instance, a HARQ process ID associated with uplink data transmission or time information corresponding thereto (e.g., indicating that an uplink reception result is a reception result associated with uplink data transmitted a k time earlier based on the time at which the group-common control channel or group-common control information is transmitted) may be included in the group-common control channel or group-common control information that the terminal receives, in order to inform the terminal of information indicating uplink data transmission that corresponds to the uplink reception result transmitted via the group-common control channel or group-common control information, and the terminal may determine the reception result associated with the uplink data based on the same. Also, if a timer, which is activated by the terminal that transmits the uplink data in operation 1320, expires, the terminal may determine that the base station does not correctly receive an uplink data signal transmitted in operation 1320.

The terminal may determine whether at least Z % of the reception results in a reference subframe or slot (in which uplink data corresponding to a HARQ_ID_ref is transmitted) among the base station's PUSCH reception results determined in operation 1330 corresponds to a NACK in operation 1340. If at least Z % of the reception result corresponds to a NACK, the terminal may change a contention window size of a channel access procedure performed for transmitting an uplink signal in the unlicensed band to a subsequently larger value in operation 1350. If it is determined that it is different from the case in which at least Z % of the reception results in the reference subframe or slot of the disclosure among the base station's PUSCH reception results determined in operation 1330 corresponds to a NACK, the terminal may maintain the contention window size of the channel access procedure performed for transmitting an uplink signal in the unlicensed band, or may change the contention window size to an initial value in operation 1360.

Figure 14:
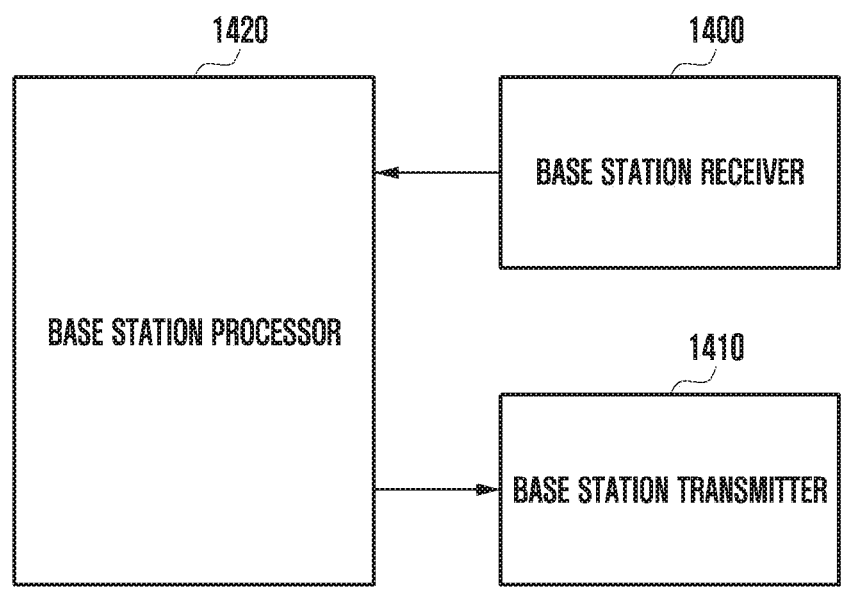
FIG. 14 is a block diagram illustrating the structure of a base station according to an embodiment of the disclosure.

Particularly, FIG. 14 is a block diagram of the internal structure of a base station according to an embodiment of the disclosure. As illustrated in FIG. 14, the base station of the disclosure may include a base station receiver 1400, a base station transmitter 1410, and a base station processor 1420. The base station receiver 1400 and the base station transmitter 1410 are commonly called a transceiver in the embodiments of the disclosure. The transceiver may perform transmission or reception of a signal with a terminal. The signal may include control information and data. To this end, the transceiver may include an RF transmitter that up-converts and amplifies a frequency of a transmitted signal, an RF receiver that low-noise amplifies a received signal and down-converts the frequency, and the like. Also, the transceiver receives a signal via a wireless channel and outputs the same to the base station processor 1420, and transmits a signal, which is output from the terminal processor 1420, via a wireless channel.

The base station processor 1420 may control a series of processes so that the base station operates according to the above-described embodiments of the disclosure. For example, the base station receiver 1400 receives a data signal including a control signal transmitted by a terminal, and the base station processor 1420 determines the result of reception of the control signal and the data signal transmitted from the terminal. As another example, the base station processor 1420 may perform a channel access procedure with respect to an unlicensed band. Particularly, for example, the base station receiver 1400 may receive signals transmitted in an unlicensed band. The base station processor 1420 may compare intensity of the received signal or the like with a predetermined threshold value, or the value of a predetermined function or the value a function including a bandwidth or the like as a factor, so as to determine whether the unlicensed band is in an idle state. Also, the base station processor 1420 may maintain or change a contention window value for a channel access procedure according to a terminal's data signal reception result received by the base station receiver 1400. If it is determined that the unlicensed band is in the idle state, the base station processor 1420 may transmit a downlink signal via the base station transmitter 1410. In this instance, the base station transmitter 1410 may transmit, to the terminal, a downlink signal including information associated with an uplink or downlink transmission interval within a channel occupancy time in the unlicensed band which is determined by the base station processor 1420.

Figure 15:
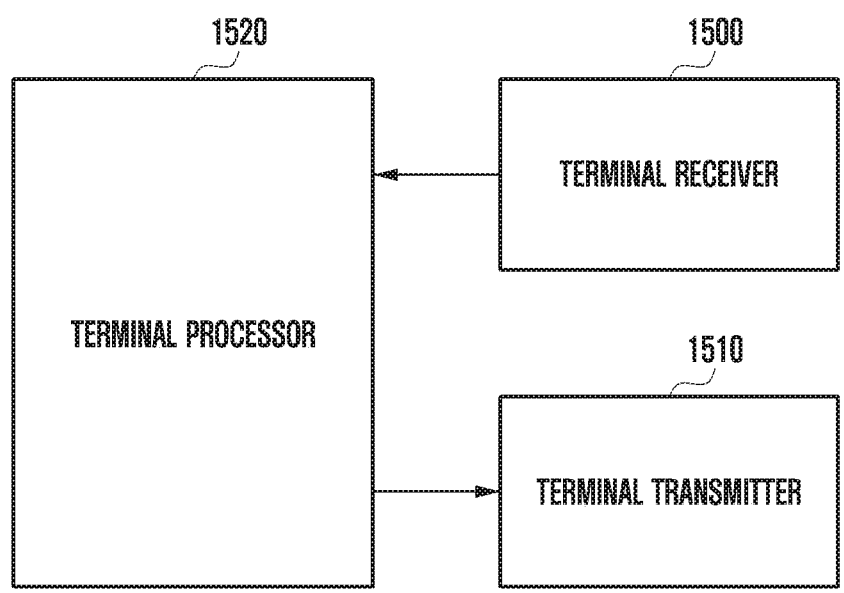
FIG. 15 is a block diagram illustrating the structure of a terminal according to an embodiment of the disclosure.

FIG. 15 is a block diagram illustrating an internal structure of the terminal according to an embodiment of the disclosure. As illustrated in FIG. 15, the terminal of the disclosure may include a terminal receiver 1500, a terminal transmitter 1510, and a terminal processor 1520. The terminal receiver 1500 and the terminal transmitter 1510 are commonly called a transceiver in the embodiments of the disclosure. The transceiver may perform transmission or reception of a signal with a base station. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver receives a signal via a wireless channel and outputs the same to the terminal processor 1520, and transmits a signal, which is output from the terminal processor 1520, via a wireless channel.

The terminal processor 1520 may control a series of processes such that the terminal operates according to the above-described embodiments of the disclosure. For example, the terminal receiver 1500 receives a data signal including a control signal, and the terminal processor 1520 determines a reception result associated with a data signal. Subsequently, in the case in which the terminal needs to transmit, to the base station, a signal reception result including the data reception at the timing, the terminal transmitter 1510 may transmit the signal reception result to the base station at the timing determined by the processor. As another example, if the terminal receiver 1500 receives, from the base station, information associated with an uplink or downlink transmission interval in the channel occupancy time of the unlicensed band, the terminal processor 1520 may change or reconfigure a downlink control channel transmission time or period, and accordingly, the terminal receiver 1500 may receive a downlink control channel transmitted by the base station. Also, the terminal receiver 1500 may receive, from the base station, a reception result associated with uplink data transmitted from the terminal transmitter 1510, and the terminal processor 1520 may maintain or change a contention window size used for a channel access procedure performed for unlicensed band signal transmission, according to the received result.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, parts of embodiments proposed in the disclosure may be combined to operate the base station and the terminal

The invention claimed is:

1. A method performed by a base station in a wireless communication system using an unlicensed band, the method comprising:
    transmitting, to a terminal, downlink data on the unlicensed band;
    receiving, from the terminal, hybrid automatic repeat request-acknowledgement (HARQ-ACK) information, wherein the HARQ-ACK information is for code block groups (CBGs) of the downlink data in response to a transmission of the downlink data being associated with the CBGs;
    identifying a size of a contention window for a channel access based on a ratio of acknowledgement (ACK) and negative acknowledgement (NACK) in the HARQ-ACK information for the CBGs of the downlink data in a reference duration and a predetermined threshold value; and
    performing a channel sensing based on the identified size of the contention window,
    wherein a number of bits included in the HARQ-ACK information corresponds to a number of CBGs configured to the terminal, in case that the transmission of the downlink data is associated with the CBGs, and
    wherein, in case that a number of CBGs of the downlink data is smaller than the number of CBGs configured to the terminal, the HARQ-ACK information includes at least a first number of bits indicating NACK value, the first number of bits being a difference between the number of CBGs configured to the terminal and the number of CBGs of the downlink data.

2. The method of claim 1, wherein the size of the contention window is initialized as a minimum value corresponding to a channel access priority class, in case that the transmission of the downlink data is associated with the CBGs and the ratio of the ACK of the HARQ-ACK information for the CBGs is greater than or equal to the threshold value.

3. The method of claim 2, wherein the size of the contention window increases to a next higher value of the size of the contention window corresponding to the channel access priority class, in case that the transmission of the downlink data is associated with the CBGs and the ratio of the ACK of the HARQ-ACK information for the CBGs is smaller than the threshold value.

4. The method of claim 1, wherein, in case that the transmission of the downlink data is associated with a transport block and the HARQ-ACK information includes at least one ACK, the size of the contention window is initialized as a minimum value corresponding to a channel access priority class.

5. The method of claim 4, wherein, in case that the transmission of the downlink data is associated with the transport block and none of ACK is included in the HARQ-ACK information, the size of the contention window increases to a next higher value of the size of contention window corresponding to the channel access priority class.

6. The method of claim 1, wherein the ratio of the ACK and the NACK in the HARQ-ACK information for the CBGs is obtained based on HARQ-ACK information corresponding to one or more transmitted CBGs by disregarding HARQ-ACK information corresponding to CBGs which are not transmitted.

7. A method performed by a terminal of a wireless communication system using an unlicensed band, the method comprising:
    receiving, from a base station, downlink data on the unlicensed band;
    obtaining hybrid automatic repeat request-acknowledgement (HARQ-ACK) information, wherein the HARQ-ACK information is for code block groups (CBGs) of the downlink data in response to a transmission of the downlink data being associated with the CBGs; and
    transmitting, to the base station, the HARQ-ACK information,
    wherein a size of a contention window for a channel access depends on a ratio of acknowledgement (ACK) and negative acknowledgement (NACK) in the HARQ-ACK information for the CBGs of the downlink data in a reference duration and a predetermined threshold value,
    wherein a number of bits included in the HARQ-ACK information corresponds to a number of CBGs configured to the terminal, in case that the transmission of the downlink data is associated with the CBGs, and
    wherein, in case that a number of CBGs of the downlink data is smaller than the number of CBGs configured to the terminal, the HARQ-ACK information includes at least a first number of bits indicating NACK value, the first number of bits being a difference between the number of CBGs configured to the terminal and the number of CBGs of the downlink data.

8. A base station in a wireless communication system using an unlicensed band, the base station comprising:
    a transceiver; and
    a controller coupled with the transceiver, and configured to:
        transmit, to a terminal, downlink data on the unlicensed band,
        receive, from the terminal, hybrid automatic repeat request-acknowledgement (HARQ-ACK) information, wherein the HARQ-ACK information is for code block groups (CBGs) of the downlink data in response to a transmission of the downlink data being associated with the CBGs,
        identify a size of a contention window for a channel access based on a ratio of acknowledgement (ACK) and negative acknowledgement (NACK) in the HARQ-ACK information for the CBGs of the downlink data in a reference duration and a predetermined threshold value, and
        perform a channel sensing based on the identified size of the contention window,
    wherein a number of bits included in the HARQ-ACK information corresponds to a number of CBGs configured to the terminal, in case that the transmission of the downlink data is associated with the CBGs, and wherein, in case that a number of CBGs of the downlink data is smaller than the number of CBGs configured to the terminal, the HARQ-ACK information includes at least a first number of bits indicating NACK value, the first number of bits being a difference between the number of CBGs configured to the terminal and the number of CBGs of the downlink data.

9. The base station of claim 8, wherein the size of the contention window is initialized as a minimum value corresponding to a channel access priority class, in case that the transmission of the downlink data is associated with the CBGs and the ratio of ACK of the HARQ-ACK information for the CBGs is greater than or equal to the threshold value.

10. The base station of claim 9, wherein the size of the contention window increases to a next higher value of the size of the contention window corresponding to the channel access priority class, in case that the transmission of the downlink data is associated with the CBGs and the ratio of the ACK of the HARQ-ACK information for the CBGs is smaller than the threshold value.

11. The base station of claim 8, wherein, in case that the transmission of the downlink data is associated with a transport block and the HARQ-ACK information includes at least one ACK, the size of the contention window is initialized as a minimum value corresponding to a channel access priority class.

12. The base station of claim 11, wherein, in case that the transmission of the downlink data is associated with a transport block and none of ACK is included in the HARQ-ACK information, the size of the contention window increases to a next higher value of the size of contention window corresponding to the channel access priority class.

13. The base station of claim 8, wherein the ratio of the ACK and the NACK in the HARQ-ACK information for the CBGs is obtained based on HARQ-ACK information corresponding to one or more transmitted CBGs by disregarding HARQ-ACK information corresponding to CBGs which are not transmitted.

14. A terminal in a wireless communication system using an unlicensed band, the terminal comprising:
 a transceiver; and
 a controller coupled with the transceiver, and configured to:
  receive, from a base station, downlink data on the unlicensed band,
  obtain hybrid automatic repeat request-acknowledgement (HARQ-ACK) information, wherein the HARQ-ACK information is for code block groups (CBGs) of the downlink data in response to a transmission of the downlink data being associated with the CBGs, and
  transmit, to the base station, the HARQ-ACK information,
 wherein a size of a contention window for a channel access depends on a ratio of acknowledgement (ACK) and negative acknowledgement (NACK) in the HARQ-ACK information for the CBGs of the downlink data in a reference duration and a predetermined threshold value,
 wherein a number of bits included in the HARQ-ACK information corresponds to a number of CBGs configured to the terminal, in case that the transmission of the downlink data is associated with the CBGs, and
 wherein, in case that a number of CBGs of the downlink data is smaller than the number of CBGs configured to the terminal, the HARQ-ACK information includes at least a first number of bits indicating NACK value, the first number of bits being a difference between the number of CBGs configured to the terminal and the number of CBGs of the downlink data.

\* \* \* \* \*